United States Patent
Yang

(10) Patent No.: US 9,521,245 B2
(45) Date of Patent: Dec. 13, 2016

(54) WEARABLE DEVICE AND METHOD FOR CONTROLLING THE SAME

(71) Applicant: LG ELECTRONICS INC., Seoul (KR)

(72) Inventor: Woosock Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/516,135

(22) Filed: Oct. 16, 2014

(65) Prior Publication Data

US 2015/0111558 A1    Apr. 23, 2015

(30) Foreign Application Priority Data

Oct. 18, 2013  (KR) .................. 10-2013-0124741

(51) Int. Cl.
| | |
|---|---|
| H04M 3/00 | (2006.01) |
| H04M 1/725 | (2006.01) |
| G04G 21/04 | (2013.01) |
| G04G 21/08 | (2010.01) |
| G06F 3/0488 | (2013.01) |
| H04M 1/04 | (2006.01) |
| H04M 1/21 | (2006.01) |

(52) U.S. Cl.
CPC ......... *H04M 1/72569* (2013.01); *G04G 21/04* (2013.01); *G04G 21/08* (2013.01); *G06F 3/0488* (2013.01); *H04M 1/04* (2013.01); *H04M 1/21* (2013.01); *H04M 1/72577* (2013.01)

(58) Field of Classification Search
CPC ...... H04M 1/72569; H04M 1/04; H04M 1/21; H04M 1/72577; G06F 3/0488; G04G 21/08; G04G 21/04

See application file for complete search history.

(56) References Cited

U.S. PATENT DOCUMENTS

| | | |
|---|---|---|
| 2008/0012835 A1 | 1/2008 | Rimon et al. |
| 2010/0219943 A1 | 9/2010 | Vanska et al. |
| 2011/0157046 A1 | 6/2011 | Lee et al. |
| 2012/0098789 A1 | 4/2012 | Ciesla et al. |
| 2012/0182296 A1* | 7/2012 | Han .................... G06F 3/04883 345/419 |
| 2013/0002538 A1 | 1/2013 | Mooring et al. |
| 2014/0267025 A1* | 9/2014 | Kim et al. ..................... 345/156 |
| 2014/0267104 A1* | 9/2014 | Ahmed et al. ................ 345/173 |
| 2014/0351832 A1* | 11/2014 | Cho et al. ..................... 719/328 |
| 2014/0354589 A1* | 12/2014 | Ahn .............. 345/174 |
| 2015/0015502 A1* | 1/2015 | Al-Nasser ..................... 345/173 |
| 2015/0029117 A1* | 1/2015 | Chen et al. .................... 345/173 |
| 2015/0031290 A1* | 1/2015 | Holman et al. .............. 455/41.2 |

(Continued)

FOREIGN PATENT DOCUMENTS

| | | |
|---|---|---|
| CN | 103338255 A | 10/2013 |
| WO | WO 2014/206347 A1 | 12/2014 |

*Primary Examiner* — Erin File
(74) *Attorney, Agent, or Firm* — Birch, Stewart, Kolasch & Birch, LLP

(57) ABSTRACT

A smart watch including a wireless communication unit configured to provide wireless communication; a battery configured to supply power to the smart watch; a base including a display configured to display information; first and second bands connected to the base such that the smart watch is attachable to a wrist of a user; and a processor configured to receive a palm touch input of the user on the display, and change a current status of the smart watch based on the received palm touch input.

19 Claims, 19 Drawing Sheets

(a)   (b)   (c)   (d)

(56) References Cited

U.S. PATENT DOCUMENTS

2015/0098309 A1* 4/2015 Adams et al. .................. 368/10
2015/0143276 A1* 5/2015 Luo .............................. 715/773
2015/0205521 A1* 7/2015 Ding et al. .................... 345/175

* cited by examiner

FIG. 7
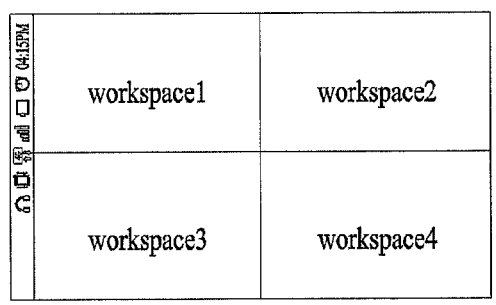
(a)
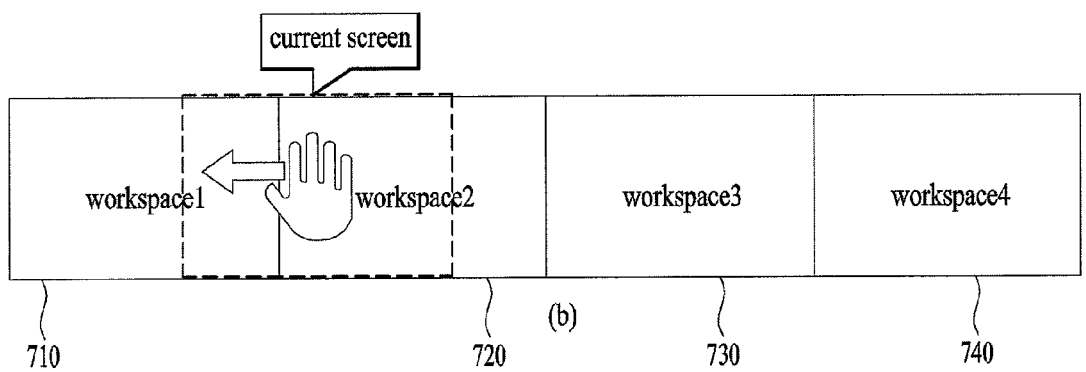
(b)

FIG. 8
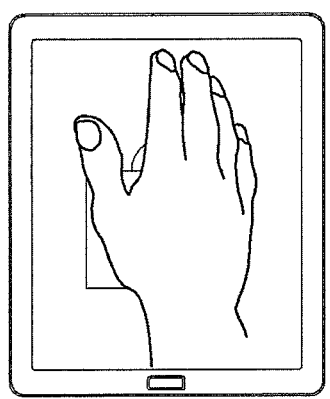
(a)
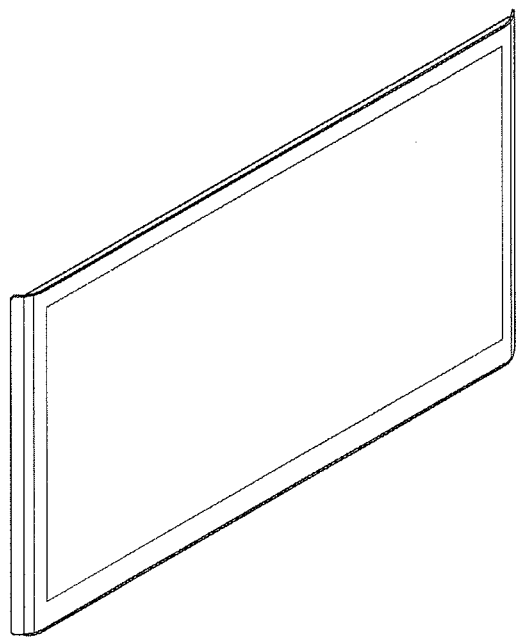
(b)

(a)   (b)   (c)

(a)          (b)

WEARABLE DEVICE AND METHOD FOR CONTROLLING THE SAME

This application claims the benefit of the Korean Patent Application No. 10-2013-0124741, filed on Oct. 18, 2013, which is hereby incorporated by reference as if fully set forth herein.

BACKGROUND OF THE INVENTION

Field of the Invention

The present invention relates to a wearable device (WD), and more particularly, to a device and method for controlling an event occurring in a wearable device in accordance with a user input.

Discussion of the Related Art

A related art display device includes a fixed type on a predetermined location such as a TV. Cellular phones, smart phones and tablet PCs are also available. Moreover, the display device includes a wearable device (WD) such as a head mounted display (HMD) or a smart watch.

The HMD can be worn like glasses, and the smart watch worn on the wrist. The HMD and the smart watch are digital devices that play and output contents. The wearable device can further realize functions of mobile devices as well as a simple display function and can be combined with techniques such as augmented reality and N screen, whereby various experiences and convenience are provided to users. However, the interaction between the user and the wearable device is generally limited to displaying information to the user.

SUMMARY OF THE INVENTION

Accordingly, one object of the present specification is to provide a wearable device and a corresponding method that substantially obviate one or more problems due to limitations and disadvantages of the related art.

Another object of the present specification is to provide a wearable device and a method for controlling the same, in which various events are processed to maximize convenience of a user and advantages of the wearable device with reference to user action.

Yet another object of the present specification is to provide a more advanced wearable device by considering the current status that various functions are incorporated into one digital device through activation of digital convergence, whereby the safety of a user and product satisfaction are improved.

To achieve these objects and other advantages and in accordance with the purpose of the specification, as embodied and broadly described herein, the present invention provides in one aspect A smart watch including a wireless communication unit configured to provide wireless communication; a battery configured to supply power to the smart watch; a base including a display configured to display information; first and second bands connected to the base such that the smart watch is attachable to a wrist of a user; and a processor configured to receive a palm touch input of the user on the display, and change a current status of the smart watch based on the received palm touch input. The present invention also provides a corresponding method of controlling the smart watch.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 7 is a diagram illustrating another embodiment related to palm touch recognition;

FIG. 8 is a diagram illustrating a method for controlling a palm touch for convenience of display screen on/off;

DETAILED DESCRIPTION OF THE INVENTION

Figure 1:
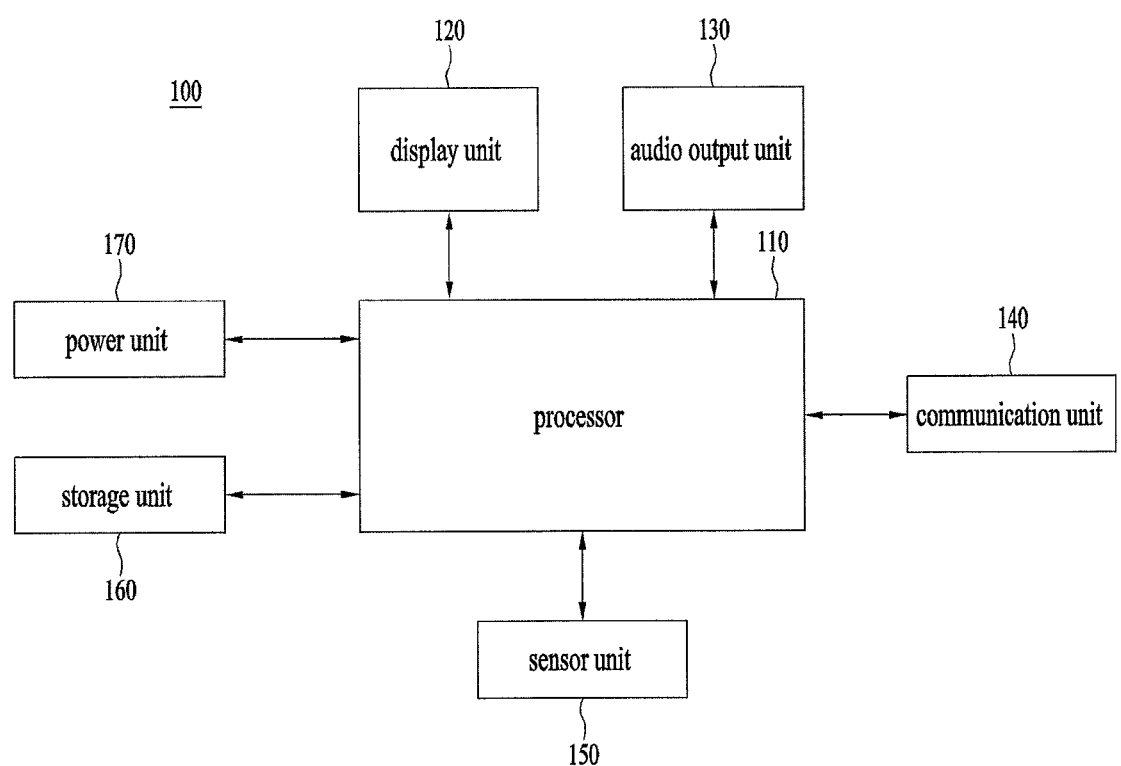
FIG. 1 is a schematic block diagram illustrating a wearable device.

Reference will now be made in detail to the preferred embodiments of the present specification, examples of which are illustrated in the accompanying drawings. Wherever possible, the same reference numbers will be used throughout the drawings to refer to the same or like parts.

In this specification, a wearable device or a wearable display device will be described. In particular, in this specification, the wearable device and a method for controlling the same is intended to be provided in which various events are processed to maximize convenience of a user and advantages of the wearable device with reference to user action. Moreover, the more advanced wearable device may be provided by considering the current status that various functions are incorporated into one digital device through activation of digital convergence or data communication with another digital device (including another wearable device), whereby the safety of a user and product satisfaction can be improved.

Hereinafter, the "wearable device" disclosed in this specification includes all kinds of digital devices that may process and output predetermined contents, information, etc. by detachably attaching or fixing a digital device to a body of a user. As examples of the wearable device, a smart watch, glasses type device such as Google glasses, a head mounted display (HMD), and a lens have been introduced and studied. In addition, examples of the wearable device may further include digital devices such as an eye mounted display (EMD), eyeglasses, eyepieces, an eye wear, and a head worn display (HWD). However, in this specification, the smart watch will be described as one embodiment of the wearable device to assist understanding of the present invention and convenience of description. However, technical spirits of the present invention may be applied to another type wearable device equally or similarly without limitation to the smart watch.

"User action" disclosed in this specification may be used as a concept that includes a gesture of a user who wears the wearable device, eye tracking, and user selection or input through a touch pad, a touch screen, a button, etc., which are provided in the wearable device. As described above, this specification is intended to control the wearable device more intuitively and more easily and conveniently to a user who detachably wears the wearable device and provide a user interface (UI) for the wearable device.

In addition, the smart watch which is one embodiment of the wearable device disclosed in this specification includes a body part and an output part, which may be detachably attached to each other. Also, the output part can switch the screen in a horizontal or vertical direction even when the output part is fixed to the body part, and be tilt at a predetermined angle in accordance with a structure of the body part and its height may be adjusted. Further, the output part can output predetermined contents or perform its functions even when the output part is detached from the body part, and may be controlled by or through the body part.

FIG. 1 illustrates a block diagram of a wearable device 100. Referring to FIG. 1, the wearable device 100 can include a processor 110, a display unit 120, an audio output unit 130, a communication unit 140, a sensor unit 150, a storage unit 160 and a power unit 170. Here, either the display unit 120 or the audio output unit 130 and a combination are called as an output unit.

Figure 2:
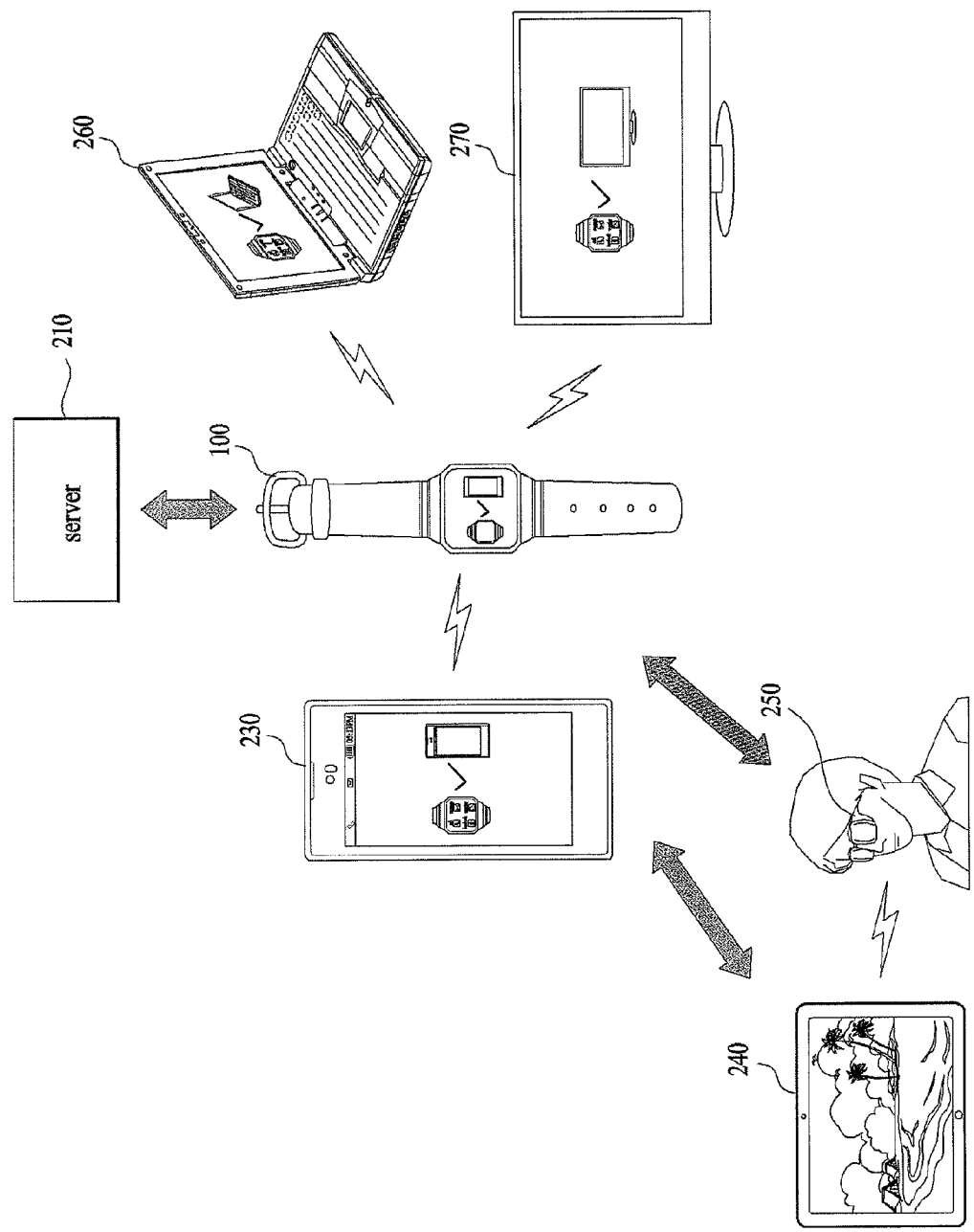
FIG. 2 is a diagram illustrating digital device(s) that can act with a wearable device.

The display unit 120 outputs content and/or a user interface in a display screen. In addition, as depicted in FIG. 2, the display unit 120 can transmit and receive data with an external device (e.g., a digital device) via the communication unit 140 by being synchronized with the external device. For instance, the display unit 120 can output content of a synchronized digital device by receiving the content in real time or non-real time.

The audio output unit 130 outputs an audio data for the content played via the processor 110. Further, the audio output unit 130 corresponds to such an audio output mechanism implemented in the wearable device as a speaker, an earphone, and the like and may be implemented by a form of a jack configured to connect with the speaker, the earphone, and the like or a form of an interface. Besides, the audio output unit can receive an audio data from an external device and may be then able to output the audio data after the audio data is processed by the processor 110.

The communication unit 140 transmits and receives data with an external device or an external communication network by performing a communication via various communication protocols. In addition, the communication protocol can include all other available wired/wireless communication protocols as well as LTE (long term evolution), LTE-A (LTE-Advanced), Wi-Fi, Bluetooth, and the like. Hence, the communication unit 140 can include at least one communication processing mechanism to support various wired/wireless communication protocols. Alternatively, the communication processing mechanism may be included in the processor 110.

In addition, the processor 110 or the communication unit 140 searches for an external device capable of being connected to the processor 110 or the communication unit 140 via a network, performs a pairing with a currently available external device among the searched external devices, and can then transceive data with the currently available external device. Further, the processor 110 or the communication unit 140 may include at least one antenna to detect location information of an external device paired with the wearable device 100. For instance, the wearable device 100 can detect or determine whether a display unit of the external device is positioned within an angle of view area of the wearable device 100 based on time difference of a signal transceived with the external device, phase difference, and the like via the antenna.

The sensor unit 150 delivers a user action, an input, a gesture, and a status, a state, or environment recognized by the wearable device to the processor 110 using at least one sensor installed in the wearable device 100. The sensor unit 150 includes a plurality of sensing mechanism. As depicted in FIG. 1, the sensor unit 150 may include at any one or more of a gravity sensor, a terrestrial magnetism sensor, a motion sensor, a gyro sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a lightning or illumination sensor.

The sensor unit 150 senses such an action as various gestures of a user, an input, environment of the user, and the like using the aforementioned sensing mechanism and may deliver data on the sensed result to the processor 110 to make the processor operate according to the sensed result. For instance, although it may be assumed that the aforementioned sensing mechanism is directly installed in the wearable device 100, other sensing mechanism, which is not directly installed in the wearable device 100, can receive sensing information by communicating with an external sensing mechanism.

For instance, the sensor unit 150 can receive data, which is sensed by a user wearing the wearable device 100 using a sensor of a smart watch put on a wrist of the user. Alternatively, the sensor unit 150 can receive sensing information from a sensor within a digital device made by a form of a chip transplanted or planted to a body of a user. Moreover, the processor 110 collects sensing information from each sensor and can use each of the sensing information, respectively or use the sensing information by combining the sensing information with each other.

In addition, the sensor unit 150 may include an imaging sensor or a camera sensor. The imaging sensor detects an image positioned within a predetermined angle of view area of the wearable device 100 and can provide the image to the processor 110. The processor 110 can determine whether there exist a digital device (or a display unit of the corresponding digital device) synchronized with the wearable device 100 within the angle of view area of the wearable device 100 based on the image detected by the imaging sensor.

The storage unit 160 can store such various data as a video, an audio, a picture, a moving clip, an application, and the like. In this instance, the storage unit 160 includes a flash memory, a RAM (random access memory), an SSD (solid state driver), a HDD (hard disc drive), and the like. The storage unit 160 can temporarily store data received from an external device via the communication unit 140. In this instance, the storage unit 160 can be used as a purpose of buffering the content received from the external device to output the content in the wearable device 100.

In addition, the storage unit 160 or a memory indicates a form installed in the wearable device 100 or arranged inside of the wearable device. Yet, in some instances, this sort of storing media concept may indicate an external storing media connected via an interface. For instance, the external storing media may include such a mobile device as a notebook, a smartphone, and a tablet PC, a BD (Blu-ray disc) player, a cloud server, an internet server (IP server), and the like.

Further, the power unit 170 is a power source connected to an internal battery of the wearable device 100 or an external power supply and supplies power to the wearable device 100. The power unit 170 may include a wireless power interface related to a wireless power supply recently developing as well as a wired jack or an interface configured to receive external electrical power.

The processor 110 controls an overall process of the wearable device as well as an overall management and processing of the wearable device. The processor 110 may include one or more elements to perform encoding, decoding and the like in relation to processing of application data, audio data, video data, image data, text data, sensed data, and the like. The processor 110 may further include one or more elements to process a CAS (conditional access system), a DRM (digital rights management), and the like. Further, the wearable device 100 depicted in FIG. 1 is a block diagram according to one embodiment. Each block can be modularized if necessary and vice versa. In addition, the wearable device 100 depicted in FIG. 1 can be implemented by a single chip or a plurality of chips according to a design of the device.

Next, FIG. 2 is a diagram illustrating digital device(s) that may interact with a wearable device 100. The wearable device 100 can transmit and receive data to and from digital device(s) or a server, which is located at a short distance or long distance, through a wire/wireless network. Referring to FIG. 2, the wearable device 100 may be connected with an external server 210 through the wire/wireless network to transmit and receive data to and from the external server 210.

In this instance, the external server 210 may include various servers, which include data, such as a broadcast station server, a content server, a service server, a head-end or multiple system operator (MSO), a personal server, and a cloud server. The wearable device 100 may be connected with digital device(s) through the wire/wireless network to transmit and receive data to and from the digital device(s). In this instance, the digital device(s) may include mobile devices such as a smart phone 230, a table PC 240, an HMD 250, and a notebook computer 260, and standing devices such as a DTV 270 and a PC.

Further, the wearable device 100 may be connected with one digital device only to perform data communication, or may be connected with a plurality of digital devices at the same time to perform data communication. Also, even though the wearable device 100 is not connected with digital device(s) directly during data communication with the corresponding digital device, the wearable device 100 may perform data communication through another digital device indirectly.

Further, if a communication protocol is not supported between the wearable device 100 and the external server 210 or the digital device, or based on various reasons such as long distance, noise and increase of power consumption, a relay or a router may be used. The relay or the router may process or convert data, if necessary, for the wearable device 210, the external server 210, or the digital device.

Hereinafter, in respect of control of a function of a smart watch according to action of a user, a method for recognizing and processing the action of the user will be described, and a method and device for controlling the smart watch according to the recognized and processed action of the user will be described. In particular, the smart watch according to an embodiment of the present invention includes a battery supplying a power source, a base having a display and a processor, and first and second bands supporting the base and having at least one sensor. Further, the processor detects a palm touch input of the user through a touch panel of the display and determines a current status of the smart watch or the display to change the determined current status of the display based on the detected palm touch input.

Also, the smart watch according to another embodiment of the present invention includes a battery supplying a power source, a base having a display and a processor, and first and second bands supporting the base and having at least one sensor. Further, the processor determines the status of the display if a control signal is received, outputs a user interface for changing a status of the display and the received control signal, and changes the status of the display by using control data selected through the output user interface. In this instance, the control signal includes a palm input through the touch panel of the display, a touch or swipe input through at least one touch pad of the smart watch, and a value sensed through at least one sensor provided on the smart watch, and the display status represents an on/off state of the display or whether a menu, function or application is implemented.

The processor can determine whether the smart watch is detached from the wrist of the user or whether the display is detached from the base, acquire and interpret at least one of the user input through at least one touch pad of the base and the value sensed through at least one sensor of the first and second bands, generate control data for changing the display, calculate a sum of recognition strength of at least one or more objects of a predetermined size, which are contacted with one another at the touch panel of the display, recognize the calculated sum of recognition strength as a palm touch input for the entire touch panel if the calculated sum is greater than a predetermined size, which is previously determined, and control the output of a user interface for changing the determined current status based on the detected palm touch input.

In addition, the status may represent at least one status of power on/off of the smart watch, on/off of the display, content output through the display, and menu output through the display, based on determined result as to whether the smart watch is detached from the wrist of the user or whether the display is detached from the base. In addition, the smart watch may further include a communication unit for performing data communication in accordance with a communication protocol previously determined between the elements of the smart watch and with the outside.

When the display is detached from the base, if the input on the base or the band is detected, the processor can generate a control signal based on the detected input, transmit the generated control signal to the display through the communication unit, and perform pairing with at least one external device. Further, if the display is detached from the base and the control signal is received from the paired external device, the processor can generate control data for controlling the display by interpreting the received control signal, and transmit the generated control data to the display. Also, the at least one external device paired with the processor may include at least one of an HMD, glasses, a mobile device and a standing device.

The smart watch can recognize a control mode of the smart watch through a hand (including finger, palm, etc.) of the user, a control mode through a gesture of a hand to which the smart watch is attached, a control mode through the other input mechanism, and a control mode through combination of two or more of the above control modes, as the action of the user and perform a control based on the recognized action. Hereinafter, the control mode of the smart watch through a hand of the user, which may recognize intention of the action of the user most easily and exactly and may be used most frequently by the user for a control of the smart watch, will be described in more detail. In particular, in this specification, a method for recognizing a palm gesture, which covers the entire screen, by considering features of the smart watch, will be described in more detail. This description assumes the touch panel is used as the output unit of the smart watch.

In addition, the smart watch can sum a signal strength reaching the touch panel to determine how much of the user's hand has reached the touch panel and also determine whether the user's hand has covered the entire touch panel. As a result, a novel UI/UX is provided to the output unit of the smart watch by recognizing a gesture that covers the entire touch panel with the palm of the user.

Palm recognition has been mainly performed through palm tuning. For example, after a size of the greatest single object that may be recognized by the touch panel has been previously determined as a palm size, sizes greater than the previously determined size have been all recognized as the palm. However, this method for recognizing the palm has difficulty in recognizing a great object or separately recognizing a plurality of small objects due to difficulty in tuning a diameter of an object recognized as a single object at 4 cm or greater, whereby an error operation may be caused. For this reason, it was difficult to perform tuning for exactly recognizing a palm gesture that covers a half of the screen or the entire screen.

In this specification, palm recognition of an object having a diameter of 3 cm to 4 cm is performed using palm tuning as described above. However, a method for exactly recognizing a palm greater than 3 cm to 4 cm or a palm that covers the entire touch panel will be described. For a capacitive touch, a strength equivalent to a size of an object reaching the touch panel can be identified. In this instance, palm recognition can be performed using a software scheme not panel tuning.

In other words, a palm gesture that covers the entire touch panel can be recognized and processed through the following procedure. First of all, if the user covers the touch panel with their entire palm, the touch panel can recognize that several objects are in contact with one another as a contact surface of the palm is not flat completely. At this time, the smart watch calculates a sum (z-sum) of a recognition strength of the objects which are recognized to be contacted with one another. If the palm of 3 cm to 4 cm is recognized by the touch panel and the calculated sum (z-sum) of recognition strength of the objects is greater than a predetermined size, the corresponding palm is recognized to cover the entire panel.

Figure 3:
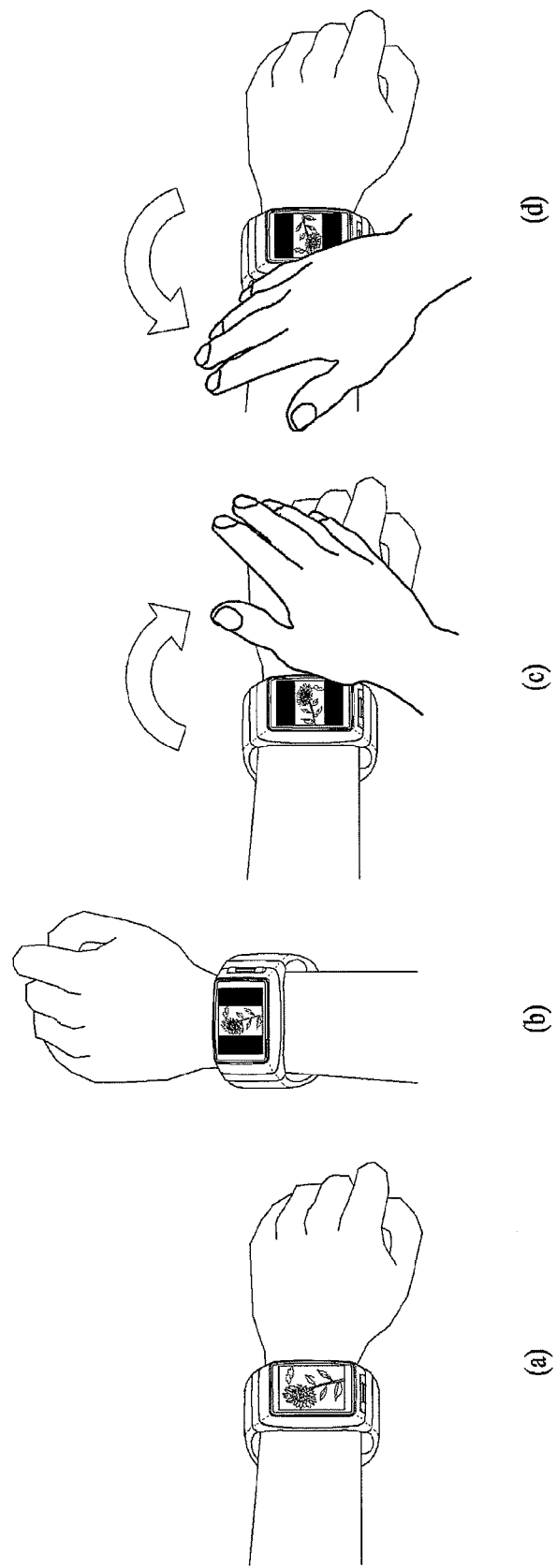
FIG. 3 is a diagram illustrating an embodiment of mode switching of a smart watch in accordance with a user action.

Hereinafter, various embodiments of the operation of the smart watch according to the user action or a scenario for providing UI/UX will be described with reference to the accompanying drawings. In particular, FIG. 3 is a diagram illustrating an embodiment of mode switching of a smart watch in accordance with user action. For a mobile device, switching to a horizontal mode and a vertical mode of the display according to a shape of the corresponding device which is arranged is performed using the value sensed by the sensor in accordance with the shape of the corresponding device. However, because the wearable device is mainly attached to a body of a user, as shown in FIG. 3(*a*) or FIG. 3(*b*), it is difficult to perform mode switching using the sensor only unlike the mobile device.

As described above, the wearable device including the output unit of the smart watch can perform mode switching like the mobile device but can also perform mode switching by using the aforementioned method for recognizing the palm instead of performing mode switching in the same manner as the mobile device. In addition, the mode switching of the output unit of the smart watch can be performed through eye tracking or direct rotation operation of the user for the output unit.

For example, for eye tracking, the user watches contents provided through the output unit by gazing at a predetermined portion of the output unit. Thus, an eye tracking sensor is provided at the predetermined portion of the output unit of the smart watch. The eye tracking sensor is provided at a proper location to determine a horizontal mode and a vertical mode. In addition, the location has no relation with the output mode whatever the output mode has a polygon or circle.

Two methods for providing contents or mode switching of the output unit according to eye tracking even when no user action may be provided. A first method is that a content provided through the output unit is switched to the horizontal mode or the vertical mode even though the output unit is not switched to the horizontal mode or the vertical mode. A second method is that the output unit is switched to the horizontal mode or the vertical mode. The second method can be used when the output unit is rotatably combined with the body unit.

Hereinafter, the method for switching to a horizontal mode or a vertical mode according to the method for recognizing a palm will be described in more detail with reference to FIG. 3. As described above, even though the user switches his or her hand to a vertical mode as shown in FIG. 3(*b*) while implementing the smart watch in a horizontal mode as shown in FIG. 3(*a*), it is difficult to recognize this mode switching by using a sensor only and it is also difficult for the user to maintain the corresponding operation.

Accordingly, as shown in FIGS. 3(*c*) and 3(*d*), when the hand shape of the user is maintained as it is, if the user touches the output unit with his or her palm, the output unit is rotated in a predetermined direction, for example, clockwise or counterclockwise. In this instance, the output unit may be rotated, or the content provided through the output unit may be rotated.

Also, the output unit can continue to be rotated in accordance with the number of times the user touches the output unit with his or her palm. For example, if the output unit has a quadrangular shape, the output unit may be rotated as much as 90° clockwise/counterclockwise whenever the user touches the output unit with his or her palm, whereby the output unit may return to its original location by rotation of 360° if the user touches the output unit with his or her palm four times continuously within a predetermined time. In this instance, palm recognition may be determined by a value sensed by a proximity sensor installed at a predetermined location of the output unit even though the palm of the user is not contacted with the output unit directly.

In addition, although the aforementioned palm recognition of FIG. 3 illustrates switching to the horizontal mode or the vertical mode, the palm recognition may be recognized as an input for another function in accordance with the current status or function of the smart watch. For example, if the user watches moving pictures through the smart watch, a palm touch of one time may mean to stop playback of the moving pictures and then another palm touch may mean to resume playback of the stopped moving pictures.

Figure 4:
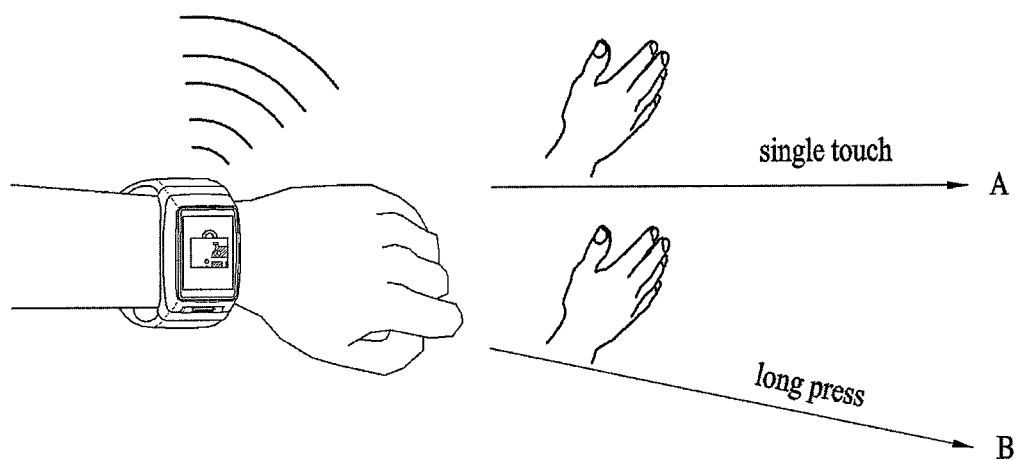
FIG. 4 is a diagram illustrating a method for controlling a smart watch function during palm recognition in accordance with a status or function of a smart watch.

Next, FIG. 4 is a diagram illustrating a method for controlling a smart watch function during palm recognition in accordance with a status or function of a smart watch. In particular, FIG. 4 is an overview illustrating controlling the smart watch during a palm touch recognition if a call is received while the user is using the smart watch in addition to the aforementioned stop and resume of playback of the moving pictures.

If the user touches the output unit shortly one time through his or her palm, the smart watch can recognize the touch as call acceptance of the user and allow the user to perform call communication (A). Afterwards, if the user touches the output unit shortly once again in the same manner, the corresponding call communication can be stopped. In this instance, because the call communication may end in error due to failure of the user or unwanted short touch of the user, if the user touches the output unit for a long time through his or her palm (palm long-touch), the call communication may be recognized to end.

In addition, because the user may not know whether call communication has ended, the processor 110 can notify the user about the end of call communication through vibration or audio. Also, for an action for ending call communication, external audio or video, that is, audio of the user of the smart watch or an image through a camera sensor may be processed as a mute or black screen so as not to be transferred to the other party until the corresponding function finally ends after the palm touch is recognized.

In addition, the user can reject a call (B). In this instance, the user can use the aforementioned palm long-touch. The palm long-touch has been used for the function for ending call communication after successfully performing call communication. However, if the user performs the palm long-touch when a call is received, the user can turn the volume of a ring tone down and hold the call reception. Afterwards, if the user wants to resume the call communication of which reception is being held, the user can perform call communication by touching the output unit shortly one time with his or her palm as described above.

Alternatively, if the user continues to touch the output unit for a long time through his or her palm while a call is being received, the user can turn the volume of a ring tone down and determine that call reception is held, as described above. If the palm touch is released within a first time range after the palm touch, the processor 110 can recognize this as call communication reception at the time when the palm touch is released. If the palm touch is released after the first time range, the processor 110 can recognize this as a forcible end or hold of call communication. An example of the first time range may include 5 seconds after the palm touch.

In addition, as described above, if the output unit is detached from the body unit or rotated based on the body unit, the output unit can control various functions separately from the palm touch or together with the palm touch. For example, if the user detaches the output unit from the body unit when receiving a call communication, the processor 110 can recognize this as a call communication reception, whereby the call communication can be connected.

If the user again attaches the output unit to the body unit, the processor 110 can recognize this as a call communication end. In this instance, the call communication end may not be recognized immediately when the output unit is again attached to the body unit, and a final call communication end may be controlled through palm recognition. Also, if the output unit is rotated, the user can recognize the call communication reception by rotating the output unit in a first direction (for example, clockwise) from the body unit, and recognize the call communication end by rotating the output unit in an opposite direction after rotation of the first direction.

Further, if the user rotates the output unit in an opposite direction, that is, a second direction (for example, counter-clockwise) from the time when the call communication is initially received, the processor 110 can recognize this as call communication rejection, whereby the smart watch may be controlled to turn the volume of a ring tone down and hold call reception.

Figure 5:
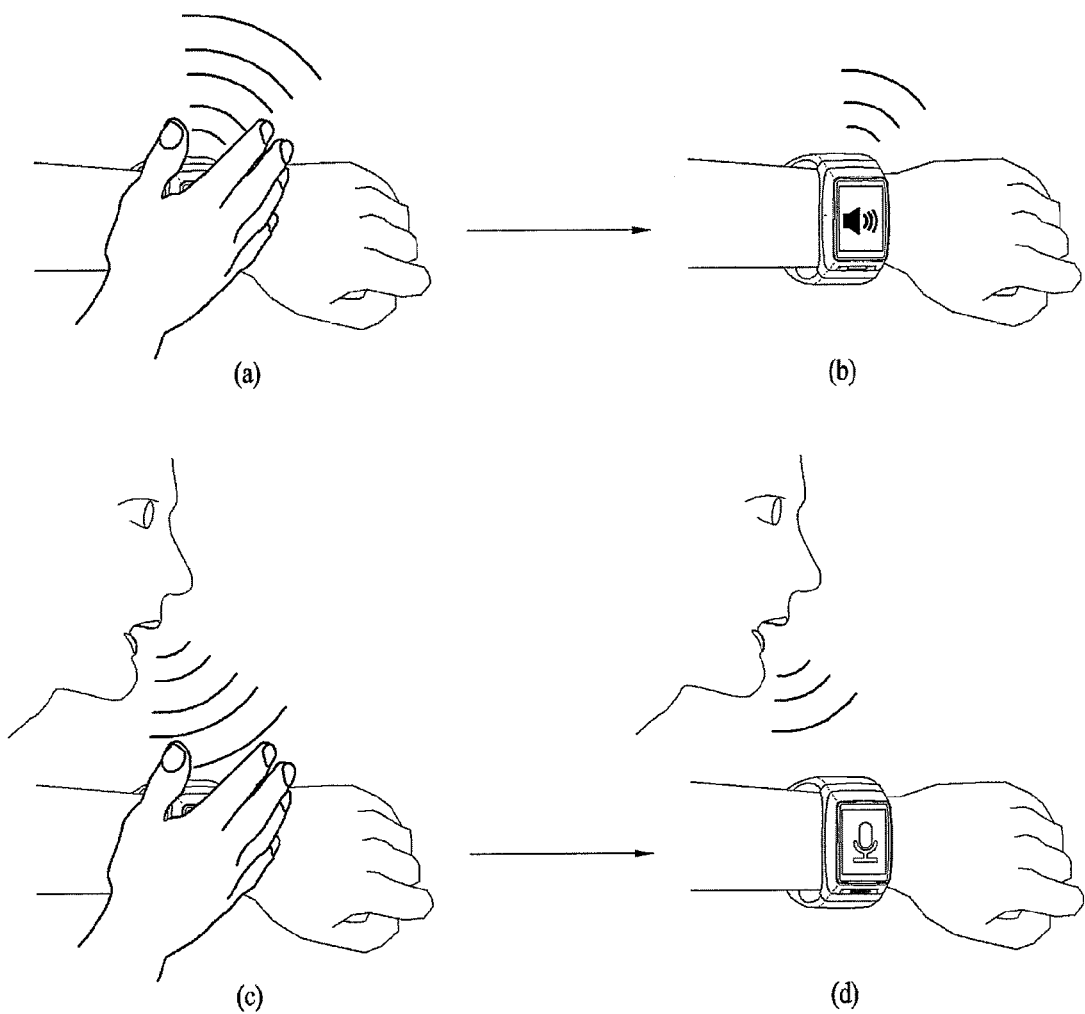
FIG. 5 is a diagram illustrating a method for controlling a smart watch according to palm touch recognition while a speaker/mike of a smart watch is being used.

Next, FIG. 5 is a diagram illustrating a method for controlling a smart watch according to palm touch recognition while a speaker/microphone of a smart watch is being used. The user can implement and control a speaker function or a microphone function of the smart watch. In more detail, the control can be performed through palm touch recognition.

That is, as shown in FIG. 5(a), after the user implements the speaker function through voice or menu selection, the user can sequentially turn the volume of the speaker down or immediately mute the volume of the speaker. Afterwards, as shown in FIG. 5(b), if the user releases the palm touch for the output unit of the smart watch, the smart watch recovers the corresponding function immediately. In this instance, the corresponding function may be recovered by the aforementioned palm touch subsequent to the initial palm touch instead of the palm touch release.

FIG. 5(c) relates to the microphone function and not the speaker function shown in FIG. 5(a). If the user touches the output unit through a palm touch, the smart watch temporarily stops the microphone function. Afterwards, as shown in FIG. 5(d), if the user releases the palm touch for the output unit, the smart watch recovers the corresponding function which is temporarily stopped, from the time when the palm touch is released.

In addition, in FIG. 5(c), if the palm touch is performed during a call communication or activation of a voice recognition function, the microphone function can be recognized as the function of increasing the microphone sensitivity. In this instance, a function of eliminating noise can be maximized, whereby the efficiency of a call communication or voice recognition function may be increased even though the user speaks at a low voice. Alternatively, if the palm touch is performed during the call communication, the smart watch can temporarily stop the microphone function, that is, turn the microphone function off and transmit an audio or message indicating a holding state for a while to the other party.

If the palm touch is released, the smart watch can recover the microphone function and transmit the audio/text indicating that a call communication has become possible to the other party. Alternatively, if the palm touch is performed during a call communication, the current mode can automatically be switched to a speaker mode or a video call mode. Also, a reset of a previous voice recognition input data or activation of a voice recognition function can be released in accordance with a type of the palm touch while the voice recognition function is being used. For example, when a short palm touch while a voice recognition function of the smart watch is being used, the voice recognition function can be mapped into the reset function. For a long palm touch, the voice recognition function can be mapped into release of activation of the voice recognition function.

Figure 6:
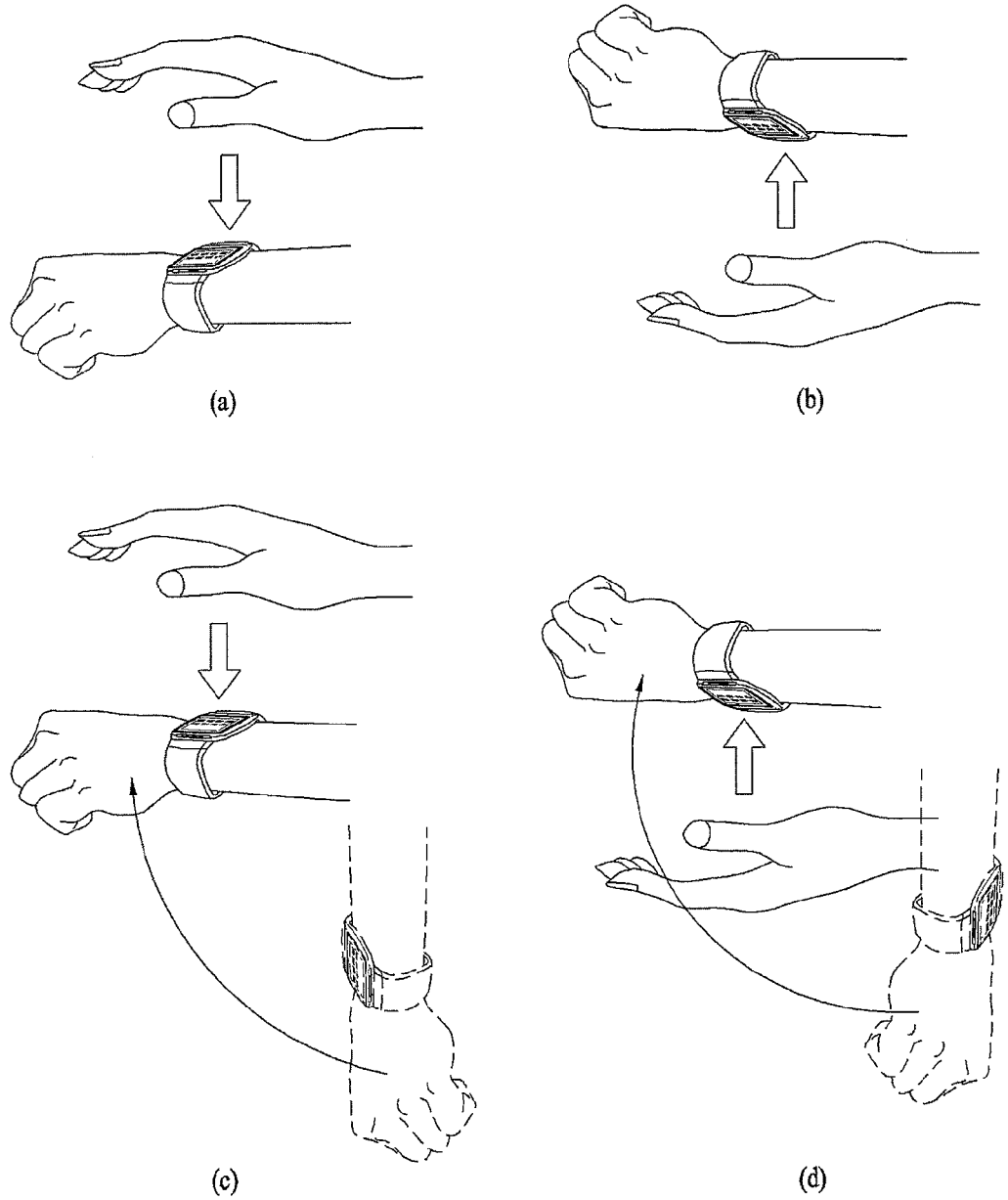
FIG. 6 is a diagram illustrating a short key function according to user action in a smart watch.

Next, FIG. 6 is a diagram illustrating a short key function according to user action in a smart watch. Since the smart watch is attached to a wrist of the user like a watch, its display screen is small, whereby it is not easy to quickly search for and implement a specific application. Accordingly, in this specification, a call application, a message application, a browser application, and a text application, for which a gesture of the user and usage frequency of the user are high, can be mapped into a short key function, whereby the usage convenience of the user is improved. In this instance, the gesture includes combination of sensing of a gyro sensor, sensing of an acceleration sensor, a palm touch gesture that covers the screen.

For example, since the smart watch is attached to a wrist of the user as described above, if the user moves the smart watch towards his or her face to watch the screen of the smart watch, a rotational force may be recognized by the sensor of the smart watch. In addition, the gyro sensor can sense whether the palm is located upwardly or downwardly. Also, the acceleration sensor can sense whether the user raises his or her arm. In other words, examples of combination of gestures of the user include i) when the user covers the smart watch from top to bottom while watching the smart watch as shown in FIG. 6(a), ii) when the user covers the smart watch from bottom to top as shown in FIG. 6(b), iii) when the user covers the smart watch from top to bottom while raising his or her arm to watch the smart watch as shown in FIG. 6(c), and iv) when the user covers the smart watch from bottom to top while raising his or her arm to watch the smart watch as shown in FIG. 6(d).

Hereinafter, the embodiment as the combination of the gestures being mapped into some function, that is, a short key function will be described. The wearable device such as the smart watch is operated at a low power mode. In view of features of the smart watch, the LCD, that is, display should always be turned on. However, turning on and off the LCD can be performed by the user to reduce power consumption. Further, the power consumption management can be activated only if the power of the smart watch is less than a predetermined level.

If the user performs a palm touch that covers the smart watch from top to bottom while watching the smart watch as shown in FIG. 6(a), or if the user performs a palm touch that covers the LCD of the smart watch from top to bottom while raising his or her arm to watch the LCD of the smart watch as shown in FIG. 6(c), the smart watch can recognize the palm touch as a request for power-on of the LCD, that is, the display. For example, a touch chip (touch IC) can be maintained to periodically check a user input even for the LCD-off state of the smart watch, whereby the palm gesture can be recognized while power consumption is being minimized.

As shown in FIG. 6(a) or 6(c), if the palm touch of the user is performed to cover the output unit, that is, the LCD from top to bottom, the LCD can be turned on and at the same time a specific function can be performed. For example, if a call is received, receiving the connection can be performed, or if a text message is received, a function of confirming the text message may be performed immediately. In addition, for confirmation of the text message, for example, although the palm touch for confirming the text message of the user has been recognized, if the user does not confirm the LCD through the sensor, the text can be switched to audio and then provided to the user. In this instance, switching of the text message to audio can be provided to only a phone number or sender previously set by the user to respect privacy of the user, and alarm audio for confirming the text message may be provided.

If the user performs a palm touch that covers the smart watch from bottom to top when the LCD of the smart watch is located downwardly as shown in FIG. 6(b), or if the user performs a palm touch that covers the LCD of the smart watch from bottom to top while raising his or her another arm to watch the LCD of the smart watch as shown in FIG. 6(d), the smart watch can recognize the palm touch as a request for power-off of the display or power-off of the turned on screen.

As shown in FIG. 6(b) or 6(d), if the palm touch of the user is performed to cover the output unit, that is, the LCD from bottom to top, the LCD can be turned off and at the same time a specific function can be performed. For example, if a call is received, rejecting the call can be performed, or if a text message is received, a function of deleting the text message can be performed immediately. Also, for deletion of the text message, for example, although the palm touch for deleting the text message of the user has been recognized, if the user does not confirm the LCD through the sensor, the corresponding text message or information of the sender can be switched to audio and then provided to the user. In this instance, switching of the text message to audio can be provided to only a phone number or sender previously set by the user to respect privacy of the user, and alarm audio for confirming the text message can be provided.

FIG. 7 is a diagram illustrating another embodiment related to palm touch recognition. In particular, FIG. 7 relates to an embodiment that the user switches the output unit of the smart watch to a workspace by swiping the smart watch in a left and right direction while touching the output unit with the palm. The embodiment of FIG. 7 may also be used for a digital device such as a tablet PC having a big display screen. Further, this embodiment may be used for a digital device such as a smart watch, which does not have a big display screen but may support a plurality of workspaces.

An operating system (OS) such as UBUNTU can support multiple workspaces. In this instance, a special program UI or special key combination for switching can be used between the respective workspaces. However, if the device having a relatively small display screen provides a complicated access procedure or UI/UX, it is difficult for the user to recognize the complicated access procedure or UI/UX and perform access. Also, the device such as a mobile device, which mainly performs access during movement, has difficulty and inconvenience in access for the aforementioned workspace switching during movement.

In order to solve such a problem, in this specification, workspace switching can be performed more easily and conveniently by using the aforementioned palm touch in accordance with the present invention. In more detail, FIG. 7(a) illustrates an example of the aforementioned multiple workspaces. In this instance, workspace switching can be performed using the palm touch mode as shown in FIG. 7(b) and not with a special key combination or special program UI according to the related art.

In FIG. 7(b), the respective workspaces are shown in series. If there is any palm touch recognition in the aforementioned method, the device identifies which workspace has been accessed. Afterwards, the device determines whether a swipe operation is performed after the palm touch is performed. If the swipe operation is performed, the device identifies which workspace is requested to perform the swipe operation. In summary, the device identifies the workspace where the palm touch is initially recognized, and recognizes the swipe operation from the identified workspace to another workspace and switches to the corresponding workspace.

Referring to FIG. 7(b), the initial palm touch identifies a second workspace 720 and then is swiped to a first workspace 710. If the device intends to perform the swipe operation from the second workspace 720 to a fourth workspace 740, the device can perform the swipe operation subsequently twice or can perform the swipe operation to reach the corresponding workspace. If the device performs the swipe operation to reach the corresponding workspace, the device can recognize the workspace at the location where the swipe operation ends and perform switching to the recognized workspace.

In FIG. 7(b), since the palm touch is UI/UX seems to select the entire screen, this palm touch gesture can be used for screen switching. Afterwards, as described above, when the palm touch is not released after the palm touch is performed, the device can recognize the swipe operation from left to right or vice versa and perform switching to the corresponding workspace. In addition, according to the aforementioned description, the device can recognize the workspace where the palm touch is initially performed. However, the device can perform workspace switching in accordance with the swipe operation without recognizing the workspace where the palm touch is initially performed.

For example, the device can support a special workspace from the multiple workspaces of FIG. 7(a) or 7(b), and if there is any access such as the palm touch, the device provides UI/UX for selection of workspace switching as shown in FIG. 7(b). At this time, as described above, since the current workspace is being implemented, if there is palm touch recognition of the user, the device determines whether there is the swipe operation of the user within a predetermined time after the corresponding palm touch recognition. As a result, if there is no swipe operation, the device determines whether the workspace where the corresponding palm touch is recognized is the same as the workspace which is being implemented.

If the workspace where the corresponding palm touch is recognized is the same as the workspace which is being implemented, the device recognizes the palm touch as a control signal that ends UI/UX of FIG. 7(b), which is being provided. However, if the workspace where the corresponding palm touch is recognized is not the same as the workspace which is being implemented, and if there is no swipe operation within the predetermined time after the palm touch is performed, the device performs switching to the corresponding workspace where the palm touch is recognized.

Further, if there is the swipe operation within the predetermined time after the palm touch is performed, the device notifies the workspace, which is being implemented in accordance with the swipe operation from left to right or vice versa, that the workspace has been selected to identify switching to the corresponding workspace in accordance with the number of swipe times. In this instance, the UI/UX of FIG. 7(b) can allow the corresponding workspace to perform flickering, color change and size change in accordance with the swipe operation, whereby user convenience in identifying switching to the corresponding workspace can be provided.

Next, FIG. 8 is a diagram illustrating a method for controlling a palm touch for conveniently turning the display screen on/off. The digital device is generally provided with a display, such as a standing device, a mobile device, and a wearable device such as a smart watch, internally includes an interface or mechanism for power on/off the device without the aid of an external input mechanism.

In addition, the interface or mechanism for powering on/off the device is likely to be involved in on/off of the display screen. For the wearable device or the mobile device, the device has a size or display screen smaller than that of the standing device and performs access during movement. In other words, for the wearable device or the mobile device, it is not easy to power on/off the display screen.

As described above, since the power on/off of the display screen is not easy through a specific interface or mechanism, a method for enabling a user to control the powering on/off of the display screen more easily will be required. If a palm touch of the user for the display screen is recognized as shown in FIG. 8(a), the display screen is powered off as shown in FIG. 8(b). If not so, the display screen is powered on. In this instance, the palm touch can be performed within a predetermined time if necessary, or powering on/off of the display can be recognized through a specific swipe operation or a specific action after the palm touch is performed.

Figure 9:
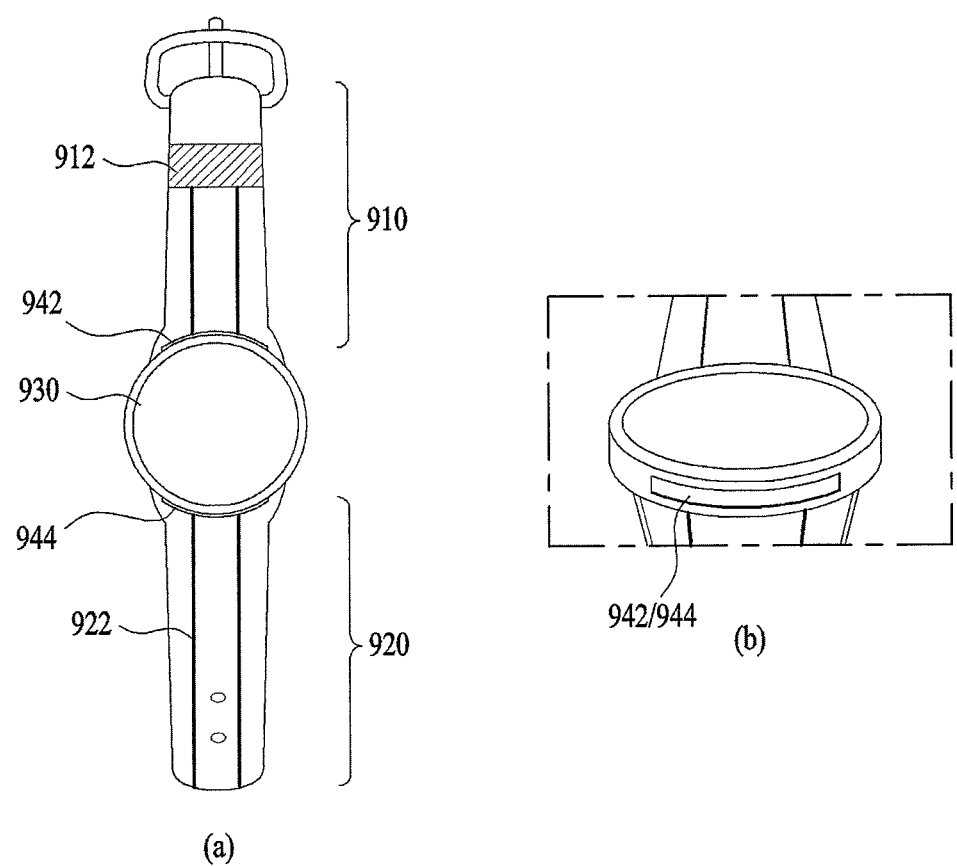
FIG. 9 is a diagram illustrating an embodiment of a structure or configuration of a smart watch.
Figure 10:
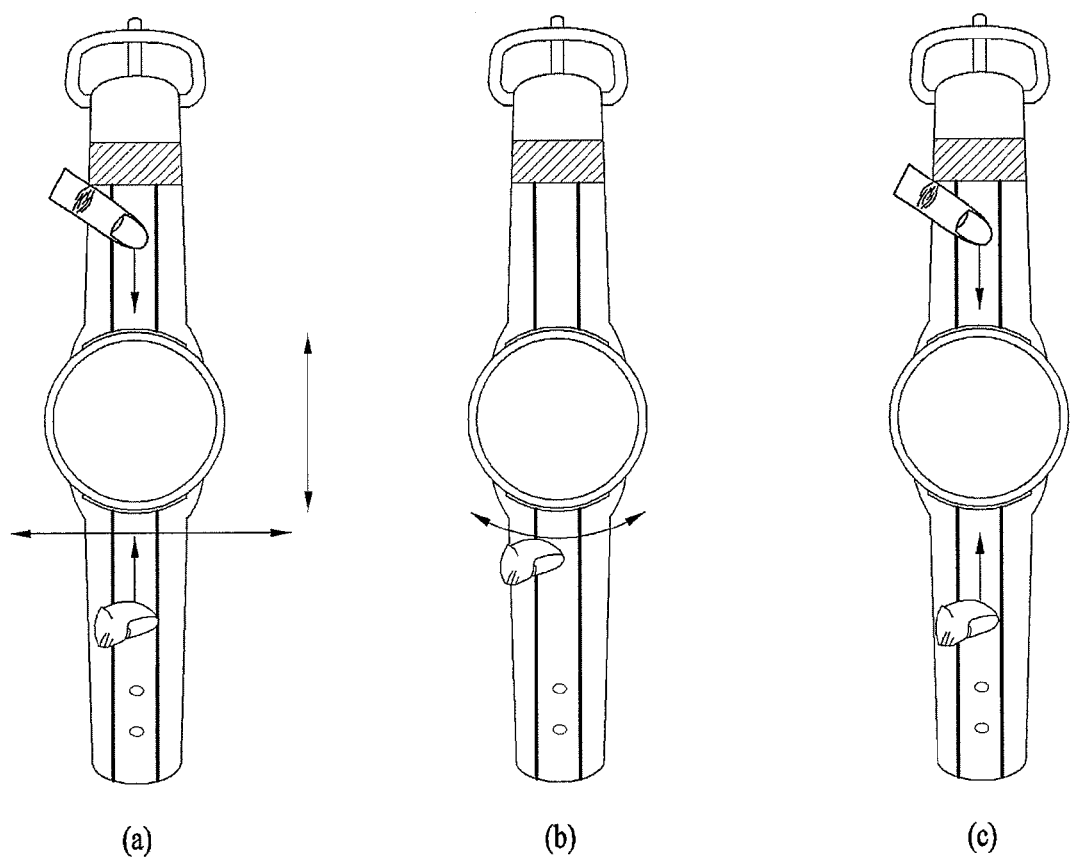
FIGS. 10 to 14 are diagrams illustrating a method for navigating functions, contents, etc. on a smart watch.
Figure 11:
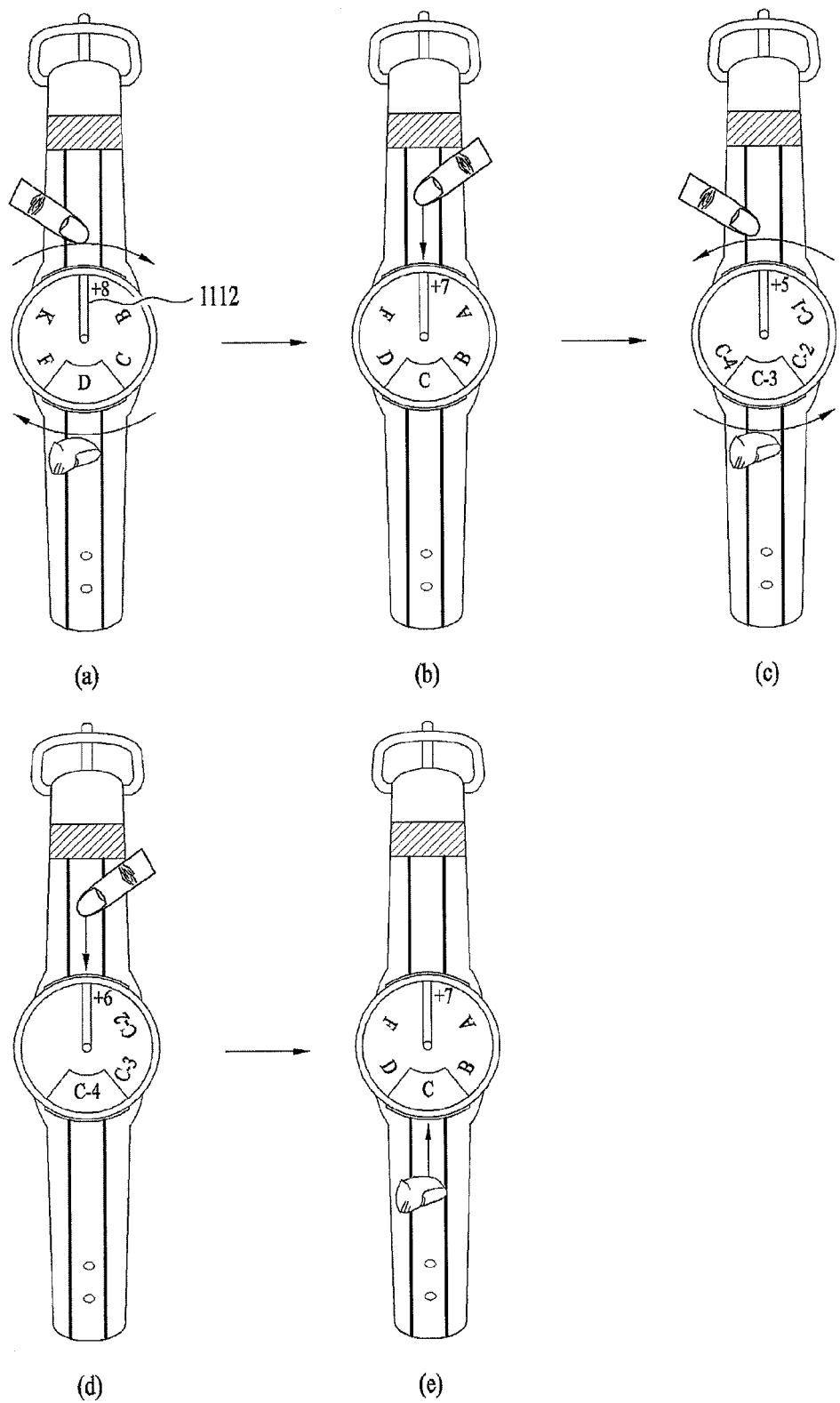

Next, FIGS. 9 to 18 are diagrams illustrating an embodiment of a structure or configuration of a smart watch and a control of various functions. Referring to FIG. 9, the smart watch includes body units 910 and 920 and an output unit 930. Hereinafter, the body units are intended to support the output unit 930 of the smart watch like watch, and can be referred to as bands for convenience of description.

In more detail, FIG. 9(a) is a perspective view illustrating the smart watch viewed from the top, and FIG. 9(b) is a perspective view illustrating the smart watch viewed from the side. Referring to FIG. 9(a), the first band 910 includes a tactile sensor 912, and the second band 920 includes a flexible stretch sensor 922. The tactile sensor 912 identifies whether the user grips the body unit, that is, the band with another hand in addition to a hand to which the smart watch is attached, or a hand of another party. In addition, the flexible stretch sensor 922 determines whether the band has been stretched.

In addition, referring to FIG. 9(a), the output unit 930 has a circle shape, and touch sensors 942 and 944 can be provided between the first band 910 and the output unit 930 and/or between the second band 920 and the output unit 930. The respective touch sensors 942 and 944 can support their respective functions different from each other, and can be used for scroll, touch determination, etc. Further, referring to FIG. 9(b), the touch sensors 942 and 944 are shown on the output unit 930. Although FIGS. 9(a) and 9(b) illustrate that the touch sensors are provided at one side of the output unit, this is just an example and the touch sensors can be provided at the entire side of the output unit.

FIGS. 10 to 14 are diagrams illustrating a method for navigating functions, contents, etc. on a smart watch. Referring to FIG. 10(a), navigation of the display screen of the device can be performed so each item of a menu screen can be navigated in a left and right direction through a swipe operation in a left and right direction on the second touch sensor (or pad) 944 after the first touch sensor (or pad) 942 is first touched. Up and down navigation for each item of the menu screen can be performed through a sensing value of the gyro sensor and/or the acceleration sensor after the first touch pad 942 is touched.

In addition, the up and down navigation can be performed through an additional touch pad further provided at the left or right side between the first touch pad 942 and the second touch pad 944, wherein the additional touch pad can be used instead of the sensing value of the gyro sensor and/or the acceleration sensor. In addition, unlike the aforementioned description, the first touch pad 942 can be a touch input for the up and down navigation, and the second touch pad 944 can be a touch input for the left and right navigation. In this instance, the navigation function can first be activated through palm touch recognition.

Unlike FIG. 10(a), FIG. 10(b) is intended to perform a quick left and right or up and down scroll function. Even though the first touch pad 942 is not touched unlike FIG. 10(a), the second touch pad 944 is swiped in a left and right direction after the corresponding screen, that is, the menu screen is output, whereby the left and right scroll function can be performed more quickly than FIG. 10(a). Further, although not shown in FIG. 10(b), the first touch pad 942 can be mapped into the quick up and down scroll function.

Unlike FIG. 10(b), FIG. 10(c) relates to a slow left and right or up and down scroll function. Although the second touch pad 944 or sensor is used after the first touch pad 942 is touched in FIG. 10(a), in FIG. 10(c), the slow left and right navigation can be performed through left and right swipe operation of the second touch pad 944 when the first touch pad 942 is touched, that is, when the touch continues to be performed. Also, the slow up and down scroll function can be performed using the aforementioned sensor or can be performed in accordance with the left and right swipe operation of the first touch pad 942 when the second touch pad 944 is touched.

In FIGS. 10(a) to 10(c), each touch pad can allow the corresponding function to be mapped by only a specific finger of the user, for example, middle finger, forefinger, and thumb. Fingerprint information can be used in association with a lock function release or log-in of the smart watch. This will be described later in more detail. Also, FIGS. 10(a) and 10(c) can be used for a reading glasses function, which will be described later.

FIGS. 11(a) to 11(e) relate to navigation when UI/UX output to the output unit is provided in a circle shape. If the smart watch is provided in a circle shape, as shown in FIG. 11, a circular UI/UX can be provided. This circular UI/UX can be for a specific function. For example, the entire menu screen can be configured by this specific function, or this specific function can relate to page screen switching or folder. In other words, the circular UI/UX can be a structure, which is basically provided, if UI/UX provided by the smart watch includes a plurality of items. This can mean a higher layer and a lower layer as well as a specific layer.

Referring to FIG. 11(a), if the circular UI/UX is provided, the smart watch provides a reference bar 1112. The corresponding smart watch can be provided so a proper size area can be allocated to navigate or select a menu item such as B, C, D, F and K clockwise. Further, a number can be displayed near the reference bar 1112. This number can indicate how many menu items of the same layer are hid without being output through the output unit.

Referring to FIGS. 11(a) and 11(b), the user can navigate and select the menu item on the output unit by swiping the second touch pad 944 of the smart watch in a left and right direction. In this instance, as shown in FIG. 11(b), if the user touches the first touch pad 942, the navigated item is selected and the selected item is differentiated from the other items, whereby the selected item can be recognized by the user. Further, if the user swipes the first touch pad 942 in a left and right direction without performing navigation through the second touch pad 944, switching to the higher layer or the lower layer of the menu which is being output can be performed immediately. The switched layer can be selected by a touch of the first touch pad 942 or the second touch pad 944 or palm touch recognition for the entire screen.

In addition, referring to FIG. 11(c), if the item C is selected in FIG. 11(b) and the selected item C has sub items such as C-1 to C-4 as lower layers, the corresponding sub item is output. Afterwards, as described above, the user can select a specific sub item through a swipe or touch of the first touch pad 942 or the second touch pad 944. In FIG. 11(d), it is noted that the sub item C-4 is selected as the first touch pad 942 is touched.

FIG. 11(e) illustrates that the current step returns to the higher layer or the previous step, that is, return is implemented if the user touches the second touch pad 944 during menu navigation as shown in FIGS. 11(a) to (d). Although return is implemented in FIG. 11(e) as the user touches the second touch pad 944, return can be implemented if the first touch pad 942 and the second touch pad 944 are touched at the same time.

Figure 12:
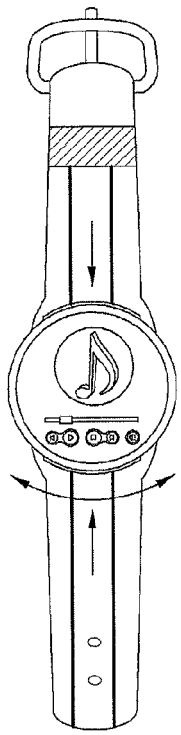

FIG. 12 illustrates that a music, moving picture or gallery application is implemented through the output unit of the smart watch. In this instance, the smart watch can perform a replay or resume operation if the user touches the first touch pad 942 and can stop replay or resume operation if the user touches the first touch pad 942 once more. Further, if the second touch pad 944 is swiped in a left and right direction, the smart watch can perform forwarding and rewinding for music, moving picture and image which are being played. Also, the smart watch can control a speed of a control operation such as forwarding and rewinding based on the corresponding direction in accordance with the number of swipe times or swipe strength of the second touch pad 944.

For example, if the number of swipe times corresponds to one time in a first direction, the smart watch can control a forwarding/rewinding speed according to the corresponding direction as normal. Also, if the number of swipe times corresponds to two times within a predetermined time in the first direction, the smart watch can control a forwarding/rewinding speed according to the corresponding direction as two times. Also, if the number of swipe times corresponds to three times continuously in the first direction, the smart watch can control a forwarding/rewinding speed according to the corresponding direction as four times.

Further, if the swipe direction corresponds to an opposite direction, that is, a second direction, a forwarding/rewinding speed which is previously set returns to a previous status or a just before status. In this instance, the previous status can mean that a forwarding or rewinding speed, which is set, is reset to a normal status regardless of the speed of four times or eight times, and the just before status can mean that the forwarding or rewinding speed is controlled to four times if the forwarding or rewinding speed is set to eight times and the forwarding or rewinding speed is controlled to two times if the forwarding or rewinding speed is set to four times.

Further, the swipe operation of one time represents switching to a forwarding/rewinding location which is mapped in accordance with the corresponding direction. If the user continues to maintain the corresponding direction by continuously touching the touch pad with his or her finger after the swipe operation in the corresponding direction, frame can be moved in a continuous operation.

Figure 13:
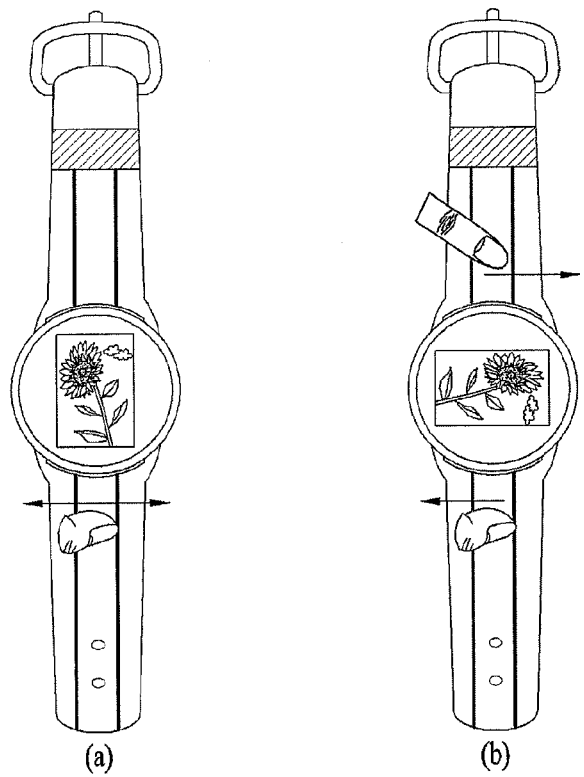

FIG. 13 is a diagram illustrating a navigation method of an image when a gallery application is implemented on the smart watch. The method of FIG. 13 can be performed together with or separately from the function described with reference to FIG. 12. For example, as shown in FIG. 13(*a*), one image is output through the output unit, and if the user swipes the second touch pad 944 in a left and right direction, next image or previous image can be output.

FIG. 13(*b*) illustrates left and right rotation of an image. In this instance, if the user performs the swipe operation by touching the first touch pad 942 and the second touch pad 944 at the same time, an output mode can be switched to a horizontal/vertical mode in the corresponding direction. The horizontal/vertical mode can mean rotation of the output unit or rotation of an image only within the output unit. Also, the number of swipe times can correspond to a predetermined angle range, and if the user touches and swipes the first touch pad 942 from right to left and the second touch pad 944 from left to right at the same time, the image can be rotated as much as 90° in a left direction.

In addition, if the user performs the swipe operation four times in the same direction, the image can be rotated as much as 360°. Afterwards, if the user touches the first touch pad 942 or performs a palm touch, the same control effect applied to the corresponding image can be applied to next image or previous image at the same time. This removes the inconvenience of the user who must repeatedly perform the same control operation for each image.

Figure 14:
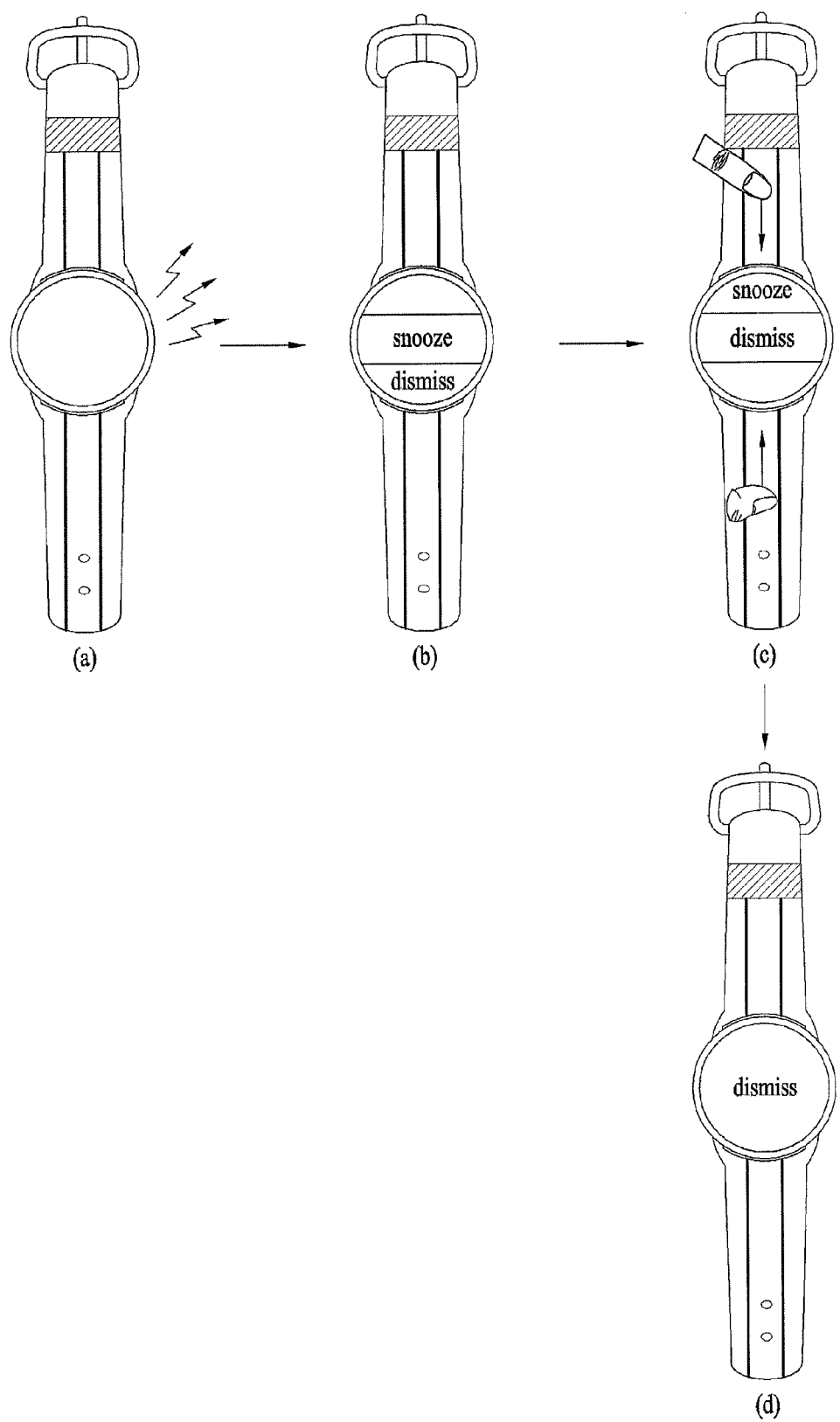

Next, FIG. 14 is a diagram illustrating navigation of a simple menu, especially illustrating navigation of an alarm function. In FIG. 14(*a*), an alarm function of the smart watch is activated. In this instance, if the user touches a band with his or her hand, a pop-up window for additionally controlling the corresponding function, that is, the alarm function is provided to the screen as shown in FIG. 14(*b*). For example, a snooze and dismiss function is output to the pop-up window. In FIG. 14(*c*), if two menu items are provided, the menu items are respectively mapped into the first touch pad 942 and the second touch pad 944.

The corresponding item can be selected depending on whether the first touch pad 942 or the second touch pad 944 is touched. Further, if a plurality of menu items are provided, two menu items are only output on a small screen, and the first touch pad 942 and the second touch pad 944 respectively mean a higher item and a lower item of the output screens. Also, a corresponding higher item or a corresponding lower item can be selected in accordance with the number of touch times of the corresponding touch pad. FIG. 14(*d*) illustrates that an alarm function dismiss item is selected in accordance with the aforementioned manner.

Figure 15:
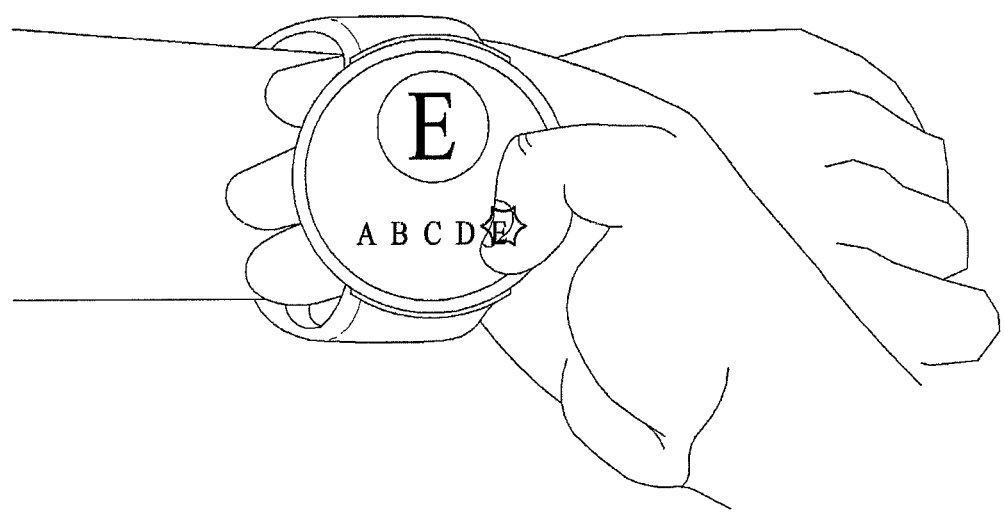
FIG. 15 is a diagram illustrating a reading glasses function of a smart watch.

FIG. 15 is a diagram illustrating a reading glasses function of a smart watch. Since the device such as the smart watch has a small display screen, it can not be easy to recognize a text or image, whereby the user can need to enlarge a specific item or page to watch the specific item or page. In this instance, the reading glasses function is required.

The display screen can be enlarged or reduced using the flexible stretch sensor 922 described in FIG. 9. Generally, if the user could not see something on the screen well, the user tends to their eyes closer to the display. Accordingly, if the user pulls the band toward them in a stretching direction of the band by gripping the rear side of the output unit, which is flexible, as shown in FIG. 15, the screen is enlarged. Further, if the pulling operation is released, the enlargement function is deactivated. In this instance, the smart watch can determine how much the screen should be enlarged by mapping an enlargement rate in accordance with a pulling level of the user through the flexible stretch sensor 922. Also, although not shown, various functions such as screen switching, playback, and stop of playback can be performed through the touch operation on the screen when the screen is enlarged.

Figure 16:
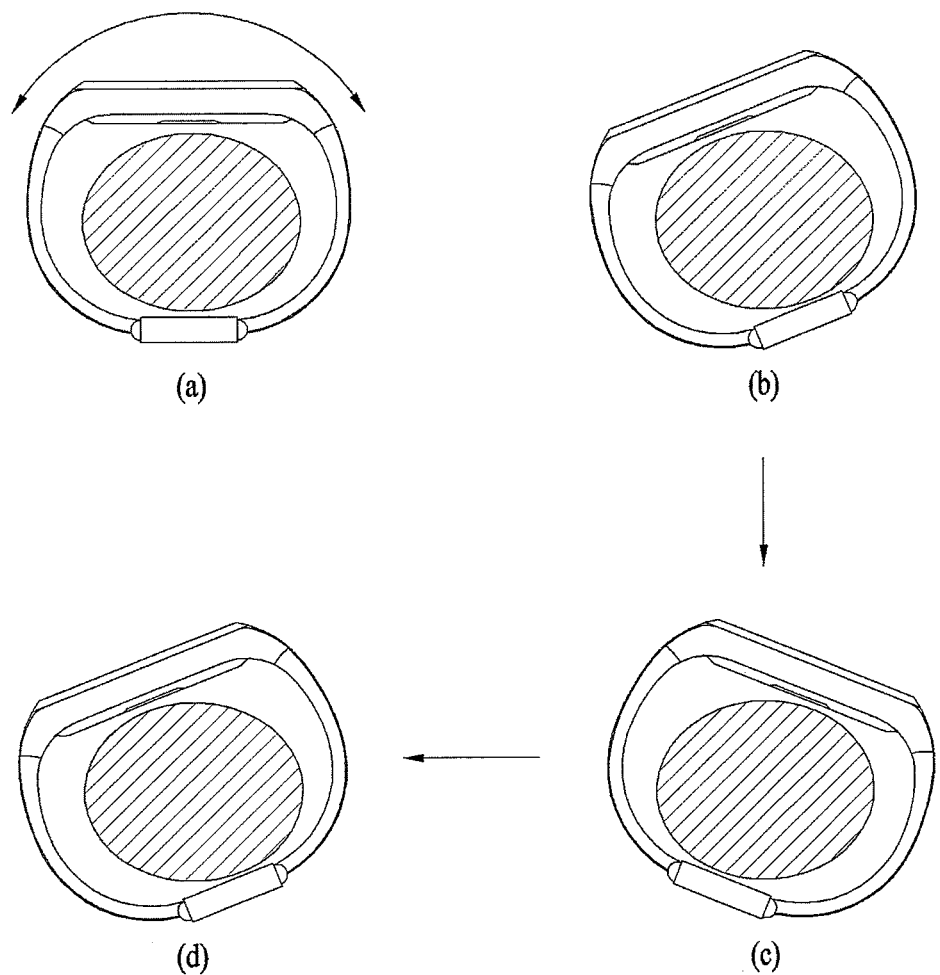
FIG. 16 is a diagram illustrating a method for locking or unlocking a smart watch.

FIG. 16 is a diagram illustrating a method for locking or unlocking a smart watch. The smart watch can be detachably attached from a wrist of the user. In this instance, the smart watch can be lost and can be used by an unwanted other party. Accordingly, a lock function of the smart watch corresponds to an important security issue to protect privacy. If the lock function of the smart watch is set, the user can use various methods to unlock the smart watch. The smart watch can be unlocked in accordance with a method previously set by the user.

FIG. 16 illustrates a method for unlocking the smart watch by turning the output unit based on the wrist of the user. Referring to FIG. 16(*a*), the user rotates the output unit clockwise or counterclockwise. In this instance, the tactile sensor 912 senses whether the user grips the band of the smart watch and then the gyro sensor and/or the acceleration sensor senses the rotation of the output unit, whereby the user can recognize the rotation pattern of the output unit. As a result, the user can determine whether to unlock the smart watch by comparing the recognized rotation pattern with an unlock pattern which is previously set.

In this instance, after the output unit is primarily rotated in a first direction (counterclockwise) based on FIG. 16(*a*), if the output unit is secondarily rotated in an opposite direction (clockwise) as shown in FIG. 16(*c*) and then rotated in the first direction as shown in FIG. 16(*d*), the smart watch can be unlocked. At this time, the directions and the number of rotation times are included in the unlock pattern which is previously set by the user.

In addition, the aforementioned unlock method can be performed through a fingerprint sensor or a fingerprint recognition program or application on the screen of the output unit instead of the tactile sensor 912. Also, the number of palm touch times can be used instead of the aforementioned rotation manner. Also, a touch sensor arranged at the edge of the output unit can be used. For example, a plurality of touch sensors can be provided at the edge of the output unit, and the sensor for unlocking the smart watch is driven. When the sensor for unlocking the smart watch is driven, the corresponding sensor is provided to the user together with an LED sensor, whereby the user can touch the sensor. The user can unlock the smart watch through combination of the touch order of the respective sensors or recognition of the touched one of the plurality of sensors.

In addition, the first touch pad 942 and the second touch pad 944 in FIGS. 9 to 16 can be replaced with the first band 910 and the second band 920 and can map or navigate a specific function. In addition, the smart watch can include sensors only at the edge of the output unit to recognize the palm touch, and the user can recognize the corresponding touch as the palm touch depending on how many sensors of the sensors arranged at the edge of the output unit have recognized the palm touch. For example, if ten sensors are arranged at the edge of the smart watch and the user recognizes at least seven or more sensors, the corresponding touch can be recognized as the palm touch.

Figure 17:
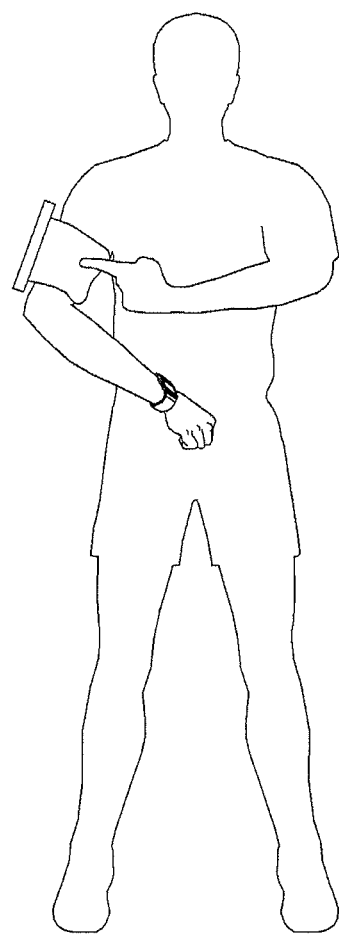
FIGS. 17 and 18 are diagrams illustrating a band function to a flexible stretch sensor.
Figure 18:
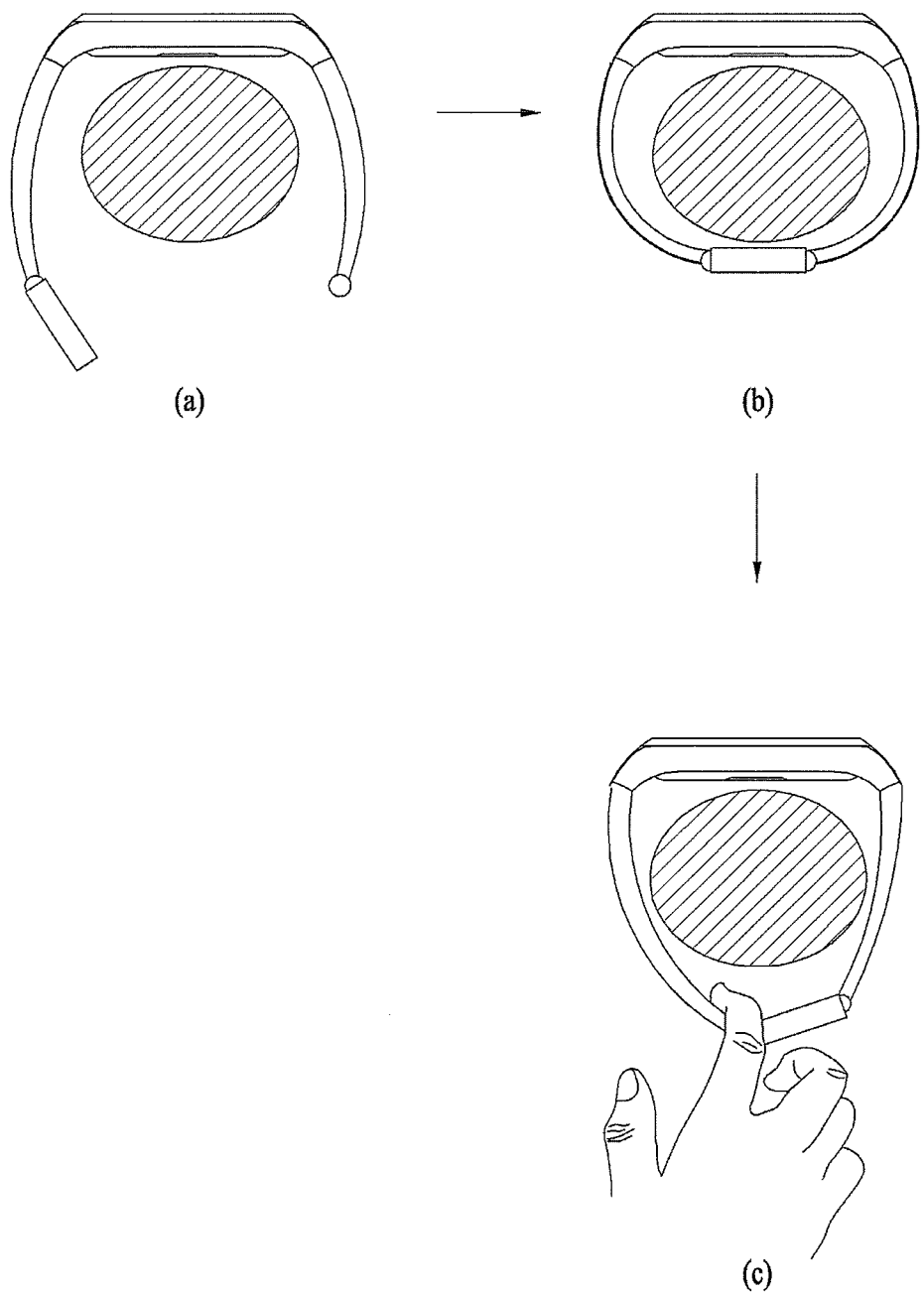

FIGS. 17 and 18 are diagrams illustrating a band function to a flexible stretch sensor. FIG. 17 illustrates that the output unit detached from the body unit of the smart watch is controlled through the body unit. As described above, the body unit and the output unit can be detached from each other, and can perform data communication with each other through a wire/wireless communication protocol and can be controlled through the wire/wireless communication protocol.

For example, whether the body unit, that is, the band can be detached from the output unit can be determined through the flexible stretch sensor. Further, the wearable device can be operated at a low power mode to perform a predetermined function only, especially when the wearable device is detached from the body of the user, whereby power consumption can be saved.

In addition, the band from which the output unit is detached or additional band can be attached to the body of the user, and can be used when the output unit is controlled. For example, supposing that the user uses the output unit of the smart watch as a navigator while driving a car or bike, it is difficult for the user to directly handle the output unit, and danger of accident can exist. Accordingly, it is preferable that the output unit can be controlled through the band. In this instance, the powering on/off of the output unit can be controlled through the touch pad of the band or by pulling the band, and switching to another mode can be performed.

In addition to the above operation, when a predetermined touch pad of the band is touched or after the predetermined touch pad of the band is touched, switching to a corresponding mode through audio input or specific function control can be performed. In addition, the output unit and the body unit can be controlled and operated in association with the other wearable device, for example, HMD.

Referring to FIG. 18, as described above, since the smart watch is sensitive to power consumption in view of the features of the wearable device, its control will be described. In FIG. 18, the flexible stretch sensor will be used as an example. FIG. 18(a) illustrates the status before the smart watch is attached to the wrist of the user, that is, the status that the smart watch is detached from the wrist of the user. FIG. 18(b) illustrates the status that the smart watch is attached to the wrist of the user, and FIG. 18(c) illustrates the operation of the user who pulls the band when the smart watch is attached to the wrist of the user as shown in FIG. 18(b).

The smart watch can recognize whether the smart watch is attached to the wrist of the user, through the flexible stretch sensor of the band, and can be operated as illustrated in the following Table 1.

TABLE 1

| Detached status (non-bound status) | Attached status (bound status) |
| --- | --- |
| 1  Power off | Power on |
| 2  LCD off | LCD on |
| 3  Simple watch mode | OS mode |
| 4  Function selective off of GPS, GPU, etc. | Full activation of all functions |

The function of Table 1 can be switched in accordance with the detached status of FIG. 18(a) and the attached status of FIG. 18(b). For example, as shown in FIG. 18(a), if the smart watch is detached from the wrist of the user, the smart watch is powered off, the LCD is powered off, a simple watch mode is operated, and a specific function of the GPS and GPU is selectively turned on or off. As shown in FIG. 18(b), as soon as the smart watch is attached to the wrist of the user, all the functions of FIG. 18(a) are activated so the LCD is powered on and an OS mode is operated. The OS mode means that an OS for driving the smart watch, that is, a platform that can serve as the smart watch not a simple watch is provided and driven.

Examples of the OS can include android and iOS. Further, each function is applied in accordance with the current status of the smart watch. In other words, when the smart watch is detached from the wrist of the user in Table 1, all the functions 1 to 4 cannot be operated at the same time but be operated in accordance with the relation with the attached status, and can be determined in accordance with the previous status. In addition, as shown in FIG. 18(c), the user can turn the LCD on by pulling the band even when the smart watch is attached to the wrist of the user, or can enter the OS mode from the simple watch mode.

Figure 19:
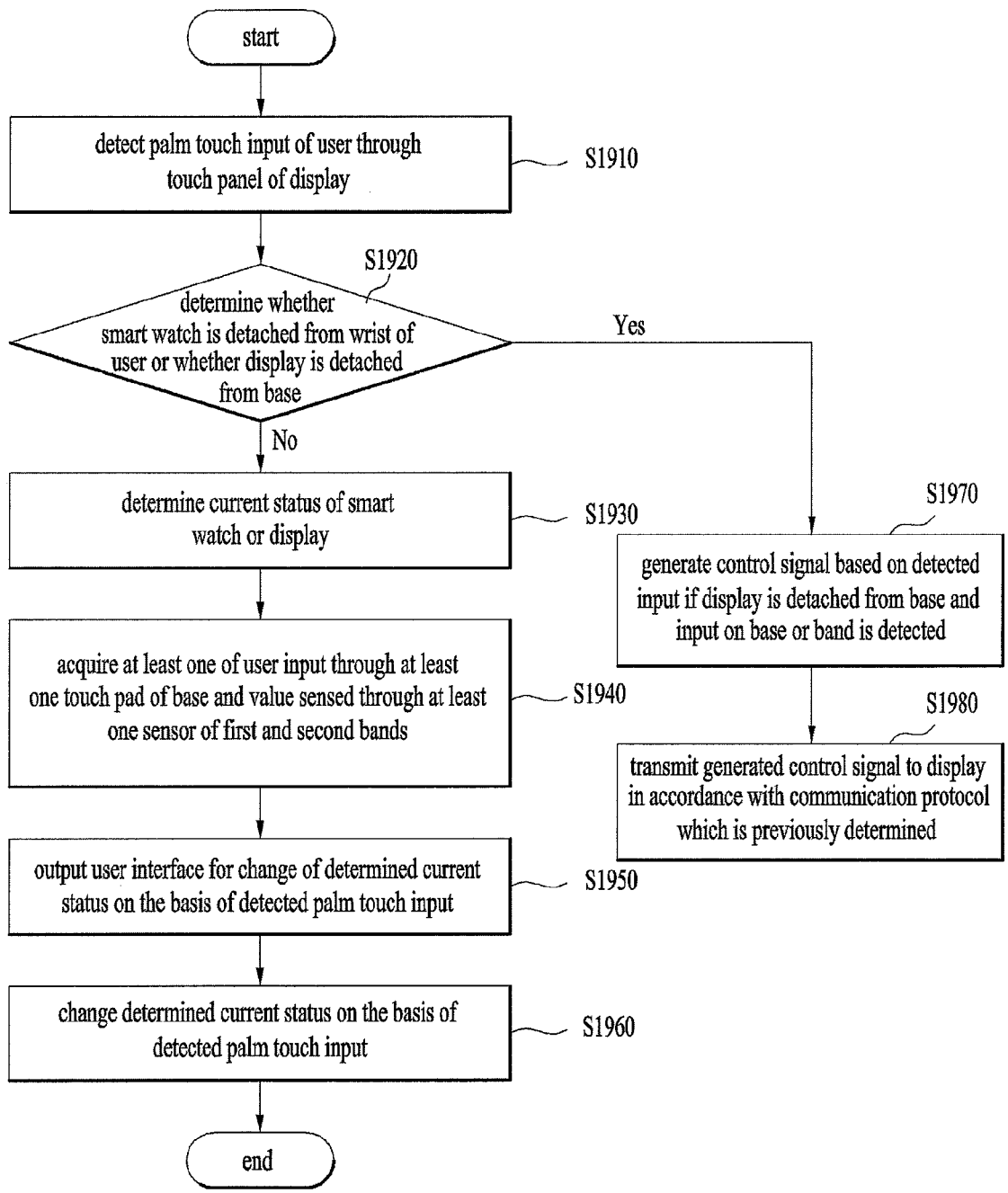
FIGS. 19 and 20 are flow charts illustrating a method for controlling a smart watch.
Figure 20:
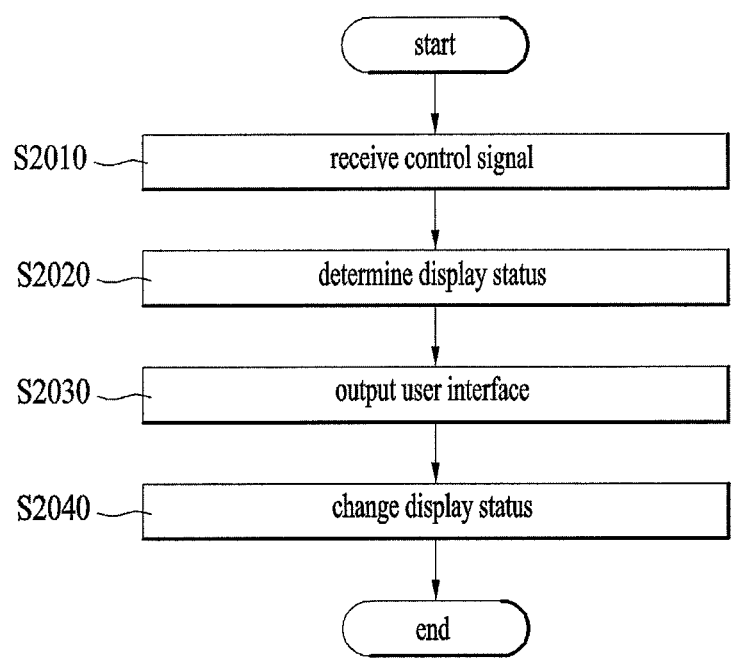

Next, FIGS. 19 and 20 are flow charts illustrating a method for controlling a smart watch. Referring to FIG. 19, and as discussed above, the smart watch includes a base for supporting the display, and first and second bands for supporting the base. The smart watch detects a palm touch input of the user through the touch panel of the display (S1910). The sum z-sum of the recognition strength of at least one or more objects of a predetermined size, which are contacted with one another at the touch panel of the display, can be calculated. If the calculated sum z-sum of the recognition strength is greater than a predetermined size, which is previously determined, the calculated sum of the recognition strength can be recognized as the palm touch input for the entire touch panel.

Further, the smart watch determines whether the smart watch is detached from the wrist of the user or whether the display is detached from the base (S1920), and determines the current status of the smart watch or the display when the smart watch or display is not detached (S1930). The smart watch acquires at least one of the user input through at least one touch pad of the base and the value sensed through at least one sensor of the first and second bands (S1940). However, the step S1940 can be performed simultaneously with at least one of the steps S1910 to S1930.

The smart watch outputs a user interface for changing the determined current status based on the detected palm touch input (S1950). The smart watch also changes the determined current status based on the detected palm touch input (S1960). The status can represent the status of at least one of powering on/off of the smart watch, on/off of the display, content output through the display, and menu output through the display based on whether the smart watch is detached from the wrist of the user and whether the display is detached from the base.

If the display is detached from the base and the input on the base or the band is detected (Yes in S1920), the smart watch generates a control signal based on the detected input (S1970), and transmits the generated control signal to the display in accordance with a communication protocol which is previously determined (S1980).

Referring to FIG. 20, the smart watch receives the control signal (S2010), and determines the status of the display (S2020). The smart watch outputs the user interface based on the determined display status and the received control signal (S2030), and changes the display status by using control data selected through the output user interface (S2040).

The control signal includes at least one of the palm input through the touch panel of the display, the touch or swipe input through at least one touch pad of the smart watch, and the value sensed through at least one sensor provided on the smart watch, and the display status can represent on/off of the display and the menu of the display or whether the function or application is implemented.

The wearable device described in this specification can be provided in the form of various devices. In particular, the wearable device can be provided in the form of various devices, which can be worn by the user to provide a display, and its examples can include eye mounted display, eyeglass, eyepiece, eye wear, and head worn display as glasses type devices, in addition to HMD. It is to be understood that the wearable device is not limited to the terminology described in this specification.

According to an embodiment of the present invention, the wearable device and the method for controlling the same can be provided in which various events are processed to maximize convenience of a user and advantages of the wearable device with reference to user action.

In addition, the more advanced wearable device can be provided by considering the current status that various functions are incorporated into one digital device through activation of digital convergence, whereby safety of a user and product satisfaction can be improved.

The aforementioned wearable device is not limited to the configuration and method of the aforementioned embodiments, and all or some of the aforementioned embodiments can selectively be configured in combination so that various modifications can be made in the aforementioned embodiments.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A smart watch comprising:
   a wireless communication unit configured to provide wireless communication;
   a battery configured to supply power to the smart watch;
   a base including a display configured to display information;
   first and second bands connected to the base such that the smart watch is attachable to a wrist of a user; and
   a processor configured to:
   receive a palm touch input of the user on the display that covers the entire display,
   calculate a sum of a recognition strength of one or more areas of a palm touching a touch panel of the display,
   determine the palm touch input is a palm touch when the calculated sum of the recognition strength is greater than a size, which is previously determined, and
   change a current status of the smart watch based on the received palm touch input.

2. The smart watch according to claim 1, wherein the processor is further configured to:
   receive a gesture input of the palm touch input, and
   display an image on the display in accordance with a direction of the received gesture of the palm touch input.

3. The smart watch according to claim 1, wherein the processor is further configured to:
   receive an incoming communication event on the smart watch, and
   accept or reject the incoming communication event based on a length of time the palm touch input remains on the display.

4. The smart watch according to claim 1, further comprising:
   a speaker configured to output sound,
   wherein the processor is further configured to:
   mute or lower a volume of the sound output by the speaker based on the palm touch input.

5. The smart watch according to claim 1, wherein the processor is further configured to:
   execute a predetermined function previously linked to the palm touch input.

6. The smart watch according to claim 1, wherein the processor is further configured to:
   display different pages on the display based on the palm touch input.

7. The smart watch according to claim 1, wherein the base includes a touch pad and the at least one of the first and second bands includes a sensor, and
   wherein the processor is further configured to:
   execute a predetermined function on the display based on a user input through the sensor or touch pad.

8. The smart watch according to claim 7, wherein the predetermined function includes one of moving or scrolling information displayed on the display in a direction of the user input.

9. The smart watch according to claim 7, wherein the predetermined function includes forwarding or rewinding a media content being output on the smart watch based on a direction of the user input.

10. The smart watch according to claim 7, wherein the predetermined function includes paging through a picture gallery being output on the display based on a direction of the user input or rotating a currently displayed picture being output on the display based on the direction of the user input.

11. The smart watch according to claim 7, wherein the predetermined function includes snoozing or dismissing an alarm being output on the smart watch based on a direction of the user input.

12. The smart watch according to claim 7, wherein the predetermined function includes enlarging information displayed on the display based on the sensor sensing a stretching of the smart watch towards the user.

13. The smart watch according to claim 7, wherein the predetermined function includes locking and unlocking the smart watch based on rotating the smart watch on the wrist of the user in a predetermined rotating pattern including clockwise and counterclockwise predetermined rotations of the smart watch on the wrist of the user.

14. The smart watch according to claim 7, wherein the processor is further configured to:
   sense whether the smart watch is detached from the wrist of the user or whether the display is detached from the base.

15. The smart watch according to claim 14, wherein when the display is sensed to be detached from the base, the processor is further configured to transmit control signals to the detached display via the wireless communication unit to control functions of the display based on the user input.

16. The smart watch according to claim 14, wherein when the display is sensed to be detached from the base, the processor is further configured to:
   perform pairing with at least one external device,
   receive a control signal from the paired external device, and control the display based on the received control signal, and wherein the paired external device includes at least one of a head mounted display (HMD), glasses, a mobile device, and a standing device.

17. The smart watch according to claim 14, wherein when the smart watch is sensed to be detached from the wrist of the user, the processor is further configured to:

perform at least one of a powering off of the smart watch, powering off the display, and entering a watch mode.

18. A method of controlling a smart watch including a processor, a battery configured to supply power to the smart watch, a base including a display configured to display information, and first and second bands connected to the base such that the smart watch is attachable to a wrist of a user, the method comprising:

providing wireless communication via a wireless communication unit;

supplying power to the smart watch via the battery;

displaying information on the display;

receiving, via a process or the smart watch, a palm touch input of the user on the display covering the entire display, calculating, via the processor, a sum of a recognition strength of one or more areas of a palm touching a touch panel of the display, determining, via the processor, the palm touch input is a palm touch when the calculated sum of the recognition strength is greater than a size, which is previously determined, and changing, via the processor, a current status of the smart watch based on the received palm touch input.

19. The method according to claim 18, further comprising:

receiving a gesture input of the palm touch input; and displaying an image of the display in accordance with a direction of the received gesture of the palm touch input.

* * * * *